US010528706B2

(12) United States Patent
Drope

(10) Patent No.: US 10,528,706 B2
(45) Date of Patent: Jan. 7, 2020

(54) MULTIMEDIA NETWORK SYSTEM WITH CONTENT IMPORTATION, CONTENT EXPORTATION, AND INTEGRATED CONTENT MANAGEMENT

(71) Applicant: Philip Drope, Tallahassee, FL (US)

(72) Inventor: Philip Drope, Tallahassee, FL (US)

(73) Assignee: Philip Drope, Tallahassee, FL (US)

( * ) Notice: Subject to any disclaimer, the term of this patent is extended or adjusted under 35 U.S.C. 154(b) by 658 days.

(21) Appl. No.: 14/930,748

(22) Filed: Nov. 3, 2015

(65) Prior Publication Data

US 2016/0057011 A1   Feb. 25, 2016

Related U.S. Application Data

(62) Division of application No. 14/887,490, filed on Oct. 20, 2015, now Pat. No. 9,600,640, which is a division
(Continued)

(51) Int. Cl.
*G06F 21/10* (2013.01)
*H04L 29/06* (2006.01)
(Continued)

(52) U.S. Cl.
CPC .......... *G06F 21/10* (2013.01); *G06F 21/6218* (2013.01); *H04L 9/0825* (2013.01);
(Continued)

(58) Field of Classification Search
CPC ..................................................... G06F 21/10
See application file for complete search history.

(56) References Cited

U.S. PATENT DOCUMENTS 5,659,539 A * 8/1997 Porter ................. G11B 27/031
348/E7.073
5,825,876 A   10/1998 Peterson, Jr.
(Continued)

FOREIGN PATENT DOCUMENTS

WO   WO2001047248   6/2001

OTHER PUBLICATIONS

Hui et al.; Client-server synchronization and buffering for variable rate multimedia retrievals; Published in: IEEE Journal on Selected Areas in Communications ( vol. 14 , Issue: 1 , Jan. 1996 ); pp. 226-237; Date of Publication: Jan. 1996; IEEE Xplore ( Year: 1996).*

(Continued)

*Primary Examiner* — Bradley W Holder
(74) *Attorney, Agent, or Firm* — McClure, Qualey & Rodack, LLP

(57) ABSTRACT

This system provides wired and/or wireless access throughout a multimedia network built on a distributed architecture which can be transparent to the user. This multimedia network includes content which is imported or generated within the network. The system allows for the content provider to determine the license status of content and update the license status of content which was previously provided by that provider. The external content can be accessed in real time or downloaded and stored within the system for later access at the convenience of the user. The usage of some content is controlled by the use of encryption and other protection methods. The system allows for storage of live video by storing the digitized video and allowing the user to control how, when and where the content is viewed. The system makes available multiple multimedia services to all users in the network or connected via the internet.

13 Claims, 18 Drawing Sheets

Related U.S. Application Data of application No. 14/725,171, filed on May 29, 2015, now Pat. No. 9,398,321, which is a division of application No. 13/477,214, filed on May 22, 2012, now Pat. No. 9,047,289, which is a division of application No. 13/422,518, filed on Mar. 16, 2012, now Pat. No. 8,964,764, which is a division of application No. 13/109,202, filed on May 17, 2011, now Pat. No. 8,868,687, which is a division of application No. 12/959,655, filed on Dec. 3, 2010, now Pat. No. 9,219,729, which is a division of application No. 11/132,771, filed on May 19, 2005, now abandoned.

(60) Provisional application No. 60/572,365, filed on May 19, 2004.

(51) Int. Cl.
*G06F 21/62* (2013.01)
*H04L 9/08* (2006.01)
*H04L 9/14* (2006.01)

(52) U.S. Cl.
CPC .............. *H04L 9/0891* (2013.01); *H04L 9/14* (2013.01); *H04L 63/0435* (2013.01); *H04L 63/0442* (2013.01); *H04L 63/061* (2013.01); *H04L 63/08* (2013.01); *H04L 63/0823* (2013.01); *H04L 63/0861* (2013.01); *G06F 2221/0724* (2013.01); *G06F 2221/0768* (2013.01)

(56) References Cited

U.S. PATENT DOCUMENTS

| | | |
|---|---|---|
| 5,892,900 A | 4/1999 | Ginter et al. |
| 5,909,491 A | 6/1999 | Luo |
| 5,910,987 A | 6/1999 | Ginter et al. |
| 5,915,019 A | 6/1999 | Ginter et al. |
| 5,917,912 A | 6/1999 | Ginter et al. |
| 5,936,936 A | 8/1999 | Alexander, Jr. et al. |
| 5,949,876 A | 9/1999 | Ginter et al. |
| 5,982,891 A | 11/1999 | Ginter et al. |
| 6,047,319 A * | 4/2000 | Olson ............... H04L 29/06 709/220 |
| 6,122,291 A * | 9/2000 | Robinson ............. H04W 28/20 370/329 |
| 6,185,683 B1 | 2/2001 | Ginter et al. |
| 6,226,618 B1 | 5/2001 | Downs et al. |
| 6,237,786 B1 | 5/2001 | Ginter et al. |
| 6,253,193 B1 | 6/2001 | Ginter et al. |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,427,140 B1 | 7/2002 | Ginter et al. |
| 6,430,620 B1 * | 8/2002 | Omura ............... H04L 47/10 709/203 |
| 6,574,609 B1 | 6/2003 | Downs et al. |
| 6,640,304 B2 | 10/2003 | Ginter et al. |
| 6,658,568 B1 | 12/2003 | Ginter et al. |
| 6,772,340 B1 | 8/2004 | Peinado |
| 6,775,655 B1 | 8/2004 | Peinado et al. |
| 6,824,051 B2 | 11/2004 | Reddy et al. |
| 6,834,302 B1 * | 12/2004 | Harvell ............ H04L 29/12066 709/224 |
| 6,948,070 B1 | 9/2005 | Ginter et al. |
| 7,017,174 B1 | 3/2006 | Sheedy |
| 7,051,212 B2 | 5/2006 | Ginter et al. |
| 7,058,720 B1 | 6/2006 | Majidimehr |
| 7,058,721 B1 * | 6/2006 | Ellison ................ G11B 27/031 348/E5.008 |
| 7,069,451 B1 | 6/2006 | Ginter et al. |
| 7,069,590 B1 | 6/2006 | Malvar |
| 7,076,652 B2 | 7/2006 | Ginter et al. |
| 7,095,854 B1 | 8/2006 | Ginter et al. |
| 7,099,946 B2 | 8/2006 | Lennon et al. |
| 7,100,199 B2 | 8/2006 | Ginter et al. |
| 7,107,462 B2 | 9/2006 | Fransdonk |
| 7,120,800 B2 | 10/2006 | Ginter et al. |
| 7,124,302 B2 | 10/2006 | Ginter et al. |
| 7,133,845 B1 | 11/2006 | Ginter et al. |
| 7,133,846 B1 | 11/2006 | Ginter et al. |
| 7,143,290 B1 | 11/2006 | Ginter et al. |
| 7,149,721 B1 | 12/2006 | Sites |
| 7,165,174 B1 | 1/2007 | Ginter et al. |
| 7,191,462 B1 | 3/2007 | Roman et al. |
| 7,206,941 B2 | 4/2007 | Raley et al. |
| 7,231,516 B1 | 6/2007 | Sparrell et al. |
| 7,233,668 B2 | 6/2007 | Weinstein et al. |
| 7,243,242 B2 | 7/2007 | Moriai |
| 7,281,133 B2 | 10/2007 | Ginter et al. |
| 7,284,201 B2 | 10/2007 | Cohen-Solal |
| 7,293,074 B1 | 11/2007 | Jellinek et al. |
| 7,392,316 B2 | 6/2008 | Klemets |
| 7,392,395 B2 | 6/2008 | Ginter et al. |
| 7,401,091 B2 | 7/2008 | Orchard |
| 7,415,617 B2 | 8/2008 | Ginter et al. |
| 7,434,052 B1 | 10/2008 | Rump |
| 7,437,300 B2 | 10/2008 | Fujimoto |
| 7,454,527 B2 | 11/2008 | Zhang et al. |
| 7,484,103 B2 | 1/2009 | Woo et al. |
| 7,493,289 B2 | 2/2009 | Verosub et al. |
| 7,496,540 B2 | 2/2009 | Irwin et al. |
| 7,536,705 B1 | 5/2009 | Boucher et al. |
| 7,546,355 B2 | 6/2009 | Kalnitsky |
| 7,587,369 B2 | 9/2009 | Ginter et al. |
| 7,590,856 B2 | 9/2009 | Morino et al. |
| 7,624,337 B2 | 11/2009 | Sull et al. |
| 7,685,643 B2 | 3/2010 | Lee et al. |
| 7,711,647 B2 | 5/2010 | Gunaseelan et al. |
| 7,752,466 B2 | 7/2010 | Ginter et al. |
| 7,801,820 B2 | 9/2010 | Molaro |
| 7,831,823 B2 | 11/2010 | Ginter et al. |
| 7,844,835 B2 | 11/2010 | Ginter et al. |
| 7,917,749 B2 | 3/2011 | Ginter et al. |
| 7,917,932 B2 | 3/2011 | Krikorian |
| 7,921,448 B2 | 4/2011 | Fickle et al. |
| 7,934,239 B1 * | 4/2011 | Dagman .......... H04N 21/23433 725/102 |
| 7,984,509 B2 | 7/2011 | Ginter et al. |
| 7,995,603 B2 | 8/2011 | Revital et al. |
| 8,006,087 B2 | 8/2011 | Ginter et al. |
| 8,055,913 B2 | 11/2011 | Ginter et al. |
| 8,112,625 B2 | 2/2012 | Ginter et al. |
| 8,131,865 B2 | 3/2012 | Rebaud et al. |
| 8,141,165 B2 | 3/2012 | Ginter et al. |
| 8,181,021 B2 | 5/2012 | Ginter et al. |
| 8,185,473 B2 | 5/2012 | Ginter et al. |
| 8,190,528 B2 | 5/2012 | Ginter et al. |
| 8,191,157 B2 | 5/2012 | Ginter et al. |
| 8,191,158 B2 | 5/2012 | Ginter et al. |
| 8,195,782 B2 | 6/2012 | Yi et al. |
| 8,229,888 B1 | 7/2012 | Roskind et al. |
| 8,291,238 B2 | 10/2012 | Ginter et al. |
| 8,316,449 B2 | 11/2012 | Ginter et al. |
| 8,386,316 B1 * | 2/2013 | Dagman ............ G06Q 30/0241 705/14.4 |
| 8,402,557 B2 | 3/2013 | Ginter et al. |
| 8,443,198 B2 | 5/2013 | Ginter et al. |
| 8,464,077 B2 | 6/2013 | Ginter et al. |
| 8,528,097 B2 | 9/2013 | Ginter et al. |
| 8,533,851 B2 | 9/2013 | Ginter et al. |
| 8,533,854 B2 | 9/2013 | Ginter et al. |
| 8,543,842 B2 | 9/2013 | Ginter et al. |
| 8,572,411 B2 | 10/2013 | Ginter et al. |
| 8,590,056 B2 | 11/2013 | Ginter et al. |
| 8,639,625 B1 | 1/2014 | Ginter et al. |
| 8,677,507 B2 | 3/2014 | Ginter et al. |
| 8,751,793 B2 | 6/2014 | Ginter et al. |
| 8,769,114 B2 | 7/2014 | Dinh et al. |
| 8,812,850 B2 | 8/2014 | Barton et al. |
| 8,868,687 B2 | 10/2014 | Drope |

(56) References Cited

U.S. PATENT DOCUMENTS

| | | |
|---|---|---|
| 8,964,764 B2 | 2/2015 | Drope |
| 9,047,289 B2 | 6/2015 | Drope |
| 9,195,845 B2 | 11/2015 | Ginter et al. |
| 9,219,729 B2 | 12/2015 | Drope |
| 9,300,657 B2 | 3/2016 | Drope |
| 9,319,725 B2 * | 4/2016 | Panigrahi .......... H04L 65/4084 |
| 9,398,321 B2 | 7/2016 | Drope |
| 9,626,363 B2 * | 4/2017 | Rosenblatt ........ G06F 17/30017 |
| 9,674,257 B2 * | 6/2017 | Eyler ...................... H04L 65/80 |
| 9,716,910 B2 * | 7/2017 | Krikorian .......... H04N 21/4147 |
| 9,805,174 B2 | 10/2017 | Drope |
| 9,923,951 B2 * | 3/2018 | Dimov .................... H04L 67/10 |
| 2001/0014157 A1 | 8/2001 | Hashimoto et al. |
| 2001/0016838 A1 | 8/2001 | Landrock |
| 2001/0036524 A1 | 11/2001 | Anderson |
| 2001/0042107 A1 | 11/2001 | Palm |
| 2002/0019978 A1 | 2/2002 | Terretta |
| 2002/0035692 A1 | 3/2002 | Moriai |
| 2002/0048369 A1 | 4/2002 | Ginter et al. |
| 2002/0059144 A1 | 5/2002 | Meffiert et al. |
| 2002/0077986 A1 | 6/2002 | Kobata et al. |
| 2002/0105951 A1 * | 8/2002 | Hannuksela ...... H04L 29/06027 |
| | | 370/389 |
| 2002/0112171 A1 | 8/2002 | Ginter et al. |
| 2002/0138442 A1 | 9/2002 | Hori et al. |
| 2002/0143629 A1 | 10/2002 | Mineyama et al. |
| 2002/0146237 A1 | 10/2002 | Safadi |
| 2002/0147687 A1 | 10/2002 | Breiter et al. |
| 2002/0157002 A1 | 10/2002 | Messerges et al. |
| 2002/0174433 A1 | 11/2002 | Baumgartner et al. |
| 2002/0186843 A1 | 12/2002 | Weinstein et al. |
| 2002/0191764 A1 | 12/2002 | Hori et al. |
| 2003/0012294 A1 * | 1/2003 | Nakamura .......... H04L 12/4013 |
| | | 375/295 |
| 2003/0031465 A1 | 2/2003 | Blake |
| 2003/0076955 A1 | 4/2003 | Alve et al. |
| 2003/0078853 A1 | 4/2003 | Peinado et al. |
| 2003/0088700 A1 | 5/2003 | Aiken |
| 2003/0088784 A1 | 5/2003 | Ginter et al. |
| 2003/0105721 A1 | 6/2003 | Ginter et al. |
| 2003/0131353 A1 | 7/2003 | Blom et al. |
| 2003/0136247 A1 | 7/2003 | Mizuno |
| 2003/0140257 A1 | 7/2003 | Peterka et al. |
| 2003/0163431 A1 | 8/2003 | Ginter et al. |
| 2003/0165150 A1 * | 9/2003 | Zimmermann ... H04L 29/06027 |
| | | 370/412 |
| 2003/0191719 A1 | 10/2003 | Ginter et al. |
| 2003/0208565 A1 | 11/2003 | Nishihara et al. |
| 2003/0225893 A1 | 12/2003 | Roese et al. |
| 2004/0052504 A1 | 3/2004 | Yamada et al. |
| 2004/0054630 A1 | 3/2004 | Ginter et al. |
| 2004/0054711 A1 | 3/2004 | Multer |
| 2004/0060977 A1 | 4/2004 | Proennecke |
| 2004/0064572 A1 | 4/2004 | Yamaguchi et al. |
| 2004/0064712 A1 | 4/2004 | Arthur et al. |
| 2004/0083487 A1 | 4/2004 | Collens et al. |
| 2004/0103011 A1 | 5/2004 | Hatano et al. |
| 2004/0103120 A1 | 5/2004 | Fickle et al. |
| 2004/0103305 A1 | 5/2004 | Ginter et al. |
| 2004/0103444 A1 | 5/2004 | Weinberg et al. |
| 2004/0107356 A1 | 6/2004 | Shamoon et al. |
| 2004/0110468 A1 | 6/2004 | Perlman |
| 2004/0117430 A1 | 6/2004 | Bazot et al. |
| 2004/0117440 A1 | 6/2004 | Singer et al. |
| 2004/0123129 A1 | 6/2004 | Ginter et al. |
| 2004/0133793 A1 | 7/2004 | Ginter et al. |
| 2004/0139022 A1 | 7/2004 | Singer et al. |
| 2004/0139027 A1 | 7/2004 | Molaro |
| 2004/0139207 A1 | 7/2004 | de Jong |
| 2004/0139312 A1 | 7/2004 | Medvinsky |
| 2004/0156614 A1 | 8/2004 | Bumgardner et al. |
| 2004/0176958 A1 | 9/2004 | Salmenkaita et al. |
| 2004/0177373 A1 | 9/2004 | Kawabe et al. |
| 2004/0181814 A1 | 9/2004 | Ellis et al. |
| 2004/0203630 A1 | 10/2004 | Wang |
| 2004/0237104 A1 | 11/2004 | Cooper et al. |
| 2004/0237116 A1 | 11/2004 | Allen |
| 2004/0261112 A1 | 12/2004 | Hicks, III et al. |
| 2004/0266399 A1 | 12/2004 | Simpson |
| 2005/0004802 A1 | 1/2005 | Johnson et al. |
| 2005/0028208 A1 | 2/2005 | Ellis et al. |
| 2005/0034147 A1 | 2/2005 | Best, Jr. et al. |
| 2005/0037740 A1 | 2/2005 | Smith et al. |
| 2005/0050067 A1 | 3/2005 | Sollicito et al. |
| 2005/0071129 A1 | 3/2005 | Yeap et al. |
| 2005/0076213 A1 | 4/2005 | Conlow |
| 2005/0086501 A1 | 4/2005 | Woo et al. |
| 2005/0102698 A1 | 5/2005 | Bumgardner et al. |
| 2005/0108519 A1 | 5/2005 | Barton et al. |
| 2005/0120386 A1 | 6/2005 | Stone |
| 2005/0138357 A1 | 6/2005 | Swenson et al. |
| 2005/0166230 A1 | 7/2005 | Gaydou et al. |
| 2005/0187649 A1 | 8/2005 | Funk et al. |
| 2005/0187879 A1 | 8/2005 | Zigmond et al. |
| 2005/0192724 A1 | 9/2005 | Hendry |
| 2005/0195978 A1 | 9/2005 | Babic et al. |
| 2005/0216938 A1 | 9/2005 | Brady, Jr. et al. |
| 2005/0229212 A1 | 10/2005 | Kuether et al. |
| 2005/0234749 A1 | 10/2005 | Attebury et al. |
| 2005/0249368 A1 | 11/2005 | Menzl et al. |
| 2005/0257271 A1 | 11/2005 | Lafornara et al. |
| 2005/0262321 A1 | 11/2005 | Iino |
| 2005/0262573 A1 | 11/2005 | Bo et al. |
| 2005/0275752 A1 | 12/2005 | Li et al. |
| 2006/0123484 A1 | 6/2006 | Babic et al. |
| 2006/0170565 A1 | 8/2006 | Husak et al. |
| 2006/0179325 A1 | 8/2006 | Debiez |
| 2006/0224696 A1 | 10/2006 | King et al. |
| 2007/0112554 A1 | 5/2007 | Goradia |
| 2007/0186266 A1 | 8/2007 | Watson et al. |
| 2007/0209061 A1 | 9/2007 | Dekeyzer et al. |
| 2008/0107188 A1 | 5/2008 | Kennedy et al. |
| 2008/0120240 A1 | 5/2008 | Ginter et al. |
| 2008/0126798 A1 | 5/2008 | Ginter et al. |
| 2008/0126803 A1 | 5/2008 | Ginter et al. |
| 2008/0127304 A1 | 5/2008 | Ginter et al. |
| 2008/0133415 A1 | 6/2008 | Ginter et al. |
| 2008/0141033 A1 | 6/2008 | Ginter et al. |
| 2008/0148056 A1 | 6/2008 | Ginter et al. |
| 2008/0195743 A1 * | 8/2008 | Brueck ............. H04L 29/06027 |
| | | 709/231 |
| 2008/0250241 A1 | 10/2008 | Ginter et al. |
| 2008/0256272 A1 | 10/2008 | Kampmann et al. |
| 2009/0030768 A1 | 1/2009 | Ginter et al. |
| 2009/0043652 A1 | 2/2009 | Ginter et al. |
| 2009/0048978 A1 | 2/2009 | Ginter et al. |
| 2009/0132805 A1 | 5/2009 | Ginter et al. |
| 2009/0132815 A1 | 5/2009 | Ginter et al. |
| 2010/0077039 A1 | 3/2010 | Collet et al. |
| 2010/0082136 A1 * | 4/2010 | Rosenblatt ........ G06F 17/30058 |
| | | 700/94 |
| 2010/0082567 A1 * | 4/2010 | Rosenblatt ........ G06F 17/30017 |
| | | 707/705 |
| 2010/0146527 A1 * | 6/2010 | Craib ................. H04N 7/17318 |
| | | 725/5 |
| 2010/0161963 A1 | 6/2010 | Ginter et al. |
| 2010/0217994 A1 | 8/2010 | Ginter et al. |
| 2010/0228996 A1 | 9/2010 | Ginter et al. |
| 2010/0250935 A1 | 9/2010 | Ginter et al. |
| 2010/0257614 A1 | 10/2010 | Ginter et al. |
| 2010/0275040 A1 | 10/2010 | Ginter et al. |
| 2010/0313013 A1 | 12/2010 | Ginter et al. |
| 2010/0325698 A1 | 12/2010 | Ginter et al. |
| 2011/0022520 A1 | 1/2011 | Ginter et al. |
| 2011/0022846 A1 | 1/2011 | Ginter et al. |
| 2011/0047054 A1 | 2/2011 | Ginter et al. |
| 2011/0047077 A1 | 2/2011 | Ginter et al. |
| 2011/0047078 A1 | 2/2011 | Ginter et al. |
| 2011/0047389 A1 | 2/2011 | Ginter et al. |
| 2011/0113122 A1 | 5/2011 | Drope |
| 2011/0145602 A1 | 6/2011 | Ginter et al. |
| 2011/0173695 A1 | 7/2011 | Ginter et al. |
| 2011/0197285 A1 | 8/2011 | Ginter et al. |
| 2011/0219397 A1 | 9/2011 | Drope |

(56) References Cited

U.S. PATENT DOCUMENTS

| | | |
|---|---|---|
| 2012/0002717 A1 | 1/2012 | Ma et al. |
| 2012/0116934 A1* | 5/2012 | Chittella ............... G06Q 30/04 705/34 |
| 2012/0173629 A1 | 7/2012 | Drope |
| 2012/0233652 A1 | 9/2012 | Drope |
| 2012/0278837 A1* | 11/2012 | Curtis ............... H04N 21/4828 725/42 |
| 2013/0298154 A1* | 11/2013 | Panigrahi ............ H04L 65/4084 725/28 |
| 2013/0346562 A1 | 12/2013 | Kim |
| 2014/0143889 A1 | 5/2014 | Ginter et al. |
| 2014/0230010 A1 | 8/2014 | Ginter et al. |
| 2014/0281006 A1* | 9/2014 | Major ..................... H04L 65/60 709/231 |
| 2014/0380408 A1 | 12/2014 | Ginter et al. |
| 2015/0020093 A1 | 1/2015 | Drope |
| 2015/0201230 A1 | 7/2015 | Drope |
| 2015/0249545 A1 | 9/2015 | Kure et al. |
| 2015/0271568 A1 | 9/2015 | Drope |
| 2015/0281221 A1 | 10/2015 | Drope |
| 2015/0304338 A1 | 10/2015 | Pherson et al. |
| 2016/0042157 A1 | 2/2016 | Drope |
| 2016/0066010 A1 | 3/2016 | Drope |
| 2016/0094870 A1 | 3/2016 | Drope |
| 2016/0171189 A1 | 6/2016 | Drope |
| 2016/0173935 A1* | 6/2016 | Naik Raikar ...... H04N 21/4383 725/14 |

OTHER PUBLICATIONS

Wijayaratne et al.; System support for providing integrated services from networked multimedia storage servers; Published in: Proceeding Multimedia '01 Proceedings of the ninth ACM international conference on Multimedia; pp. 270-279; Ottawa Canada, Sep. 30-Oct. 5, 2001; ACM Digital Library (Year: 2001).*
US District Court Civil Docket; *Digital Media Technologies Inc* v. *Netflix Inc*; case No. 4:16cv243; pp. 1-7.
US District Court Civil Docket; *Digital Media Technologies Inc* v. *Amazon.Com Inc*; case No. 4:16cv244; pp. 1-7.
US District Court Civil Docket; *Digital Media Technologies Inc* v. *Hulu Inc*; case No. 4:16cv245; pp. 1-7.
Order Granting Motion to Dismiss dated Jul. 3, 2017; *Digital Media Technologies, Inc.* v. *Netflix Inc.*; (Case No. 4:16-cv-00243-MW/CAS); pp. 1-16.
Order Granting Motion to Dismiss dated Jul. 3, 2017; *Digital Media Technologies, Inc.* v. *Hulu, LLC.*; (Case No. 4:16-cv-00245-MW/CAS); pp. 1-16.
Order Granting Motion to Dismiss dated Jul. 3, 2017; *Digital Media Technologies, Inc.* v. *Amazon.com Inc.*; (Case No. 4:16-cv-00244-MW/CAS); pp. 1-16.
Decision Denying Institution of Inter Partes Review 37 C.F.R. § 42.108(b) dated May 27, 2017; Case IPR2017-00284; U.S. Pat. No. 8,964,764 B2; *Amazon.com, Hulu, LLC, and Netflix, Inc., Petitioner*, v. *Digital Media Technologies, Inc.*, Patent Owner; pp. 1-20.
Decision Denying Institution of Inter Partes Review 35 U.S.C. § 314 and 37 C.F.R. § 42.108 dated Jun. 2, 2017; Case No. IPR2017-00285; U.S. Pat. No. 9,300,657 B2; *Amazon.Com, Inc., Hulu, LLC, and Netflix, Inc.*, v. *Digital Media Technologies, Inc.*, Patent Owner; pp. 1-26.
MacLarty, et al., "Policy-Based Content Delivery: An Active Network Approach", Computer Communications 2001, vol. 24, Issue 3, pp. 241-248.
"Method for Providing End-to-End Consumer Multimedia Content Protection Over The Internet to the Home," IPCOM000005819D [online] Nov. 2001, pp. 1-4.
Opening Claim Construction Brief of Defendant Amazon.com, Inc. dated Jan. 23, 2017; *Digital Media Technologies, Inc.* v. *Amazon.com Inc.*; (Case No. 4:16-cv-00244-MW-CAS); pp. 1-37.
Plaintiff Digital Media Technologies, Inc.'s Opening Claim Construction Brief dated Jan. 23, 2017; *Digital Media Technologies, Inc.* v. *Amazon.com Inc.*; (Case No. 4:16-cv-00244-MW-CS); pp. 1-36.
Responsive Claim Construction Brief of Defendant Amazon.com, Inc. dated Feb. 13, 2017; *Digital Media Technologies, Inc.* v. *Amazon.com Inc.*; (Case No. 4:16-cv-00244-MW-CAS); pp. 1-42.
Plaintiff Digital Media Technologies, Inc.'s Claim Construction Response Brief dated Feb. 13, 2017; *Digital Media Technologies, Inc.* v. *Amazon.com Inc.*; (Case No. 4:16-cv-00244-MW-CS); pp. 1-44.
Opening Claim Construction Brief of Defendant Hulu, LLC dated Jan. 23, 2017; *Digital Media Technologies, Inc.* v. *Hulu, LLC*; (Case No. 4:16-cv-00245-MW-CAS); pp. 1-37.
Plaintiff Digital Media Technologies, Inc.'s Opening Claim Construction Brief dated Jan. 23, 2017; *Digital Media Technologies, Inc.* v. *Hulu, LLC*; (Case No. 4:16-cv-00245-MW-CS); pp. 1-36.
Responsive Claim Construction Brief of Defendant Hulu, LLC dated Feb. 13, 2017; *Digital Media Technologies, Inc.* v. *Hulu, LLC*; (Case No. 4:16-cv-00245-MW-CAS); pp. 1-42.
Plaintiff Digital Media Technologies, Inc.'s Claim Construction Response Brief dated Feb. 13, 2017; *Digital Media Technologies, Inc.* v. *Hulu, LLC*; (Case No. 4:16-cv-00245-MW-CS); pp. 1-44.
Plaintiff Digital Media Technologies, Inc.'s Claim Construction Response Brief dated Feb. 13, 2017; *Digital Media Technologies, Inc.* v. *Netflix Inc.*; (Case No. 4:16-cv-00243-MW-CS); pp. 1-44.
Responsive Claim Construction Brief of Defendant Netflix, Inc. dated Feb. 13, 2017; *Digital Media Technologies, Inc.* v. *Netflix Inc.*; (Case No. 4:16-cv-00243-MW-CAS); pp. 1-42.
Plaintiff Digital Media Technologies, Inc.'s Opening Claim Construction Brief dated Jan. 23, 2017; *Digital Media Technologies, Inc.* v. *Netflix Inc.*; (Case No. 4:16-cv-00243-MW-CS); pp. 1-36.
Opening Claim Construction Brief of Defendant Netflix, Inc. dated Jan. 23, 2017; *Digital Media Technologies, Inc.* v. *Netflix Inc.*; (Case No. 4:16-cv-00243-MW-CAS); pp. 1-37.
US District Court Civil Docket; *Digital Media Technologies Inc* v. *Amazon.com Inc*; case No. 4:16cv244; pp. 1-6.
US District Court Civil Docket; *Digital Media Technologies Inc* v. *Netflix Inc*; case No. 4:16cv243; pp. 1-6.
US District Court Civil Docket; *Digital Media Technologies Inc* v. *Hulu Inc*; case No. 4:16cv245; pp. 1-6.
Original complaint for infringement against *Hulu, LLC, Digital Media Technologies, Inc.* v. *Hulu, LLC*, 4:16-cv-00245-MW-CAS (N.D. Florida, filed Apr. 26, 2016).
Original complaint for infringement against *Netflix, Inc., Digital Media Technologies, Inc.* v. *Netflix, Inc.*, 4:16-cv-00243-MW-CAS (N.D. Florida, filed Apr. 25, 2016).
Original complaint for infringement against *Amazon.com, Inc., Digital Media Technologies, Inc.* v. *Amazon.com, Inc.*, t:16-cv-00244-MW-CAS (N.D. Florida, filed Apr. 26, 2016).
Motion to dismiss of Defendants Amazon.com, Netflix, Inc., Hulu, LLC, dated Jun. 27, 2016 (document 13, Case 4:16-cv-00245-MW-CAS).
Plaintiff's Opposition to Defendant's Motion to Dismiss, dated Jul. 11, 2016 (document 24, Case 4:16-cv-00243-MW-CAS).
Reply in Support of Motion to Dismiss of Defendants Amazon.com, Netilix, Inc., Hulu, LLC, dated Jul. 22, 2016 (document 30, Case 4:16-cv-00243-MW-CAS).
Exhibit 1 for Motion to dismiss of Defendants Amazon.com, Nettlix, Inc., Hulu, LLC, dated Jun. 27, 2016 (document 13-1, Case 4:16-cv-00245-MW-CAS).
Exhibit A for Reply in Support of Motion to Dismiss of Defendants Amazon.com, Netflix, Inc., Hulu, LLC, dated Jul. 22, 2016 (document 30-1, Case 4:16-cv-00243-MW-CAS).
Motion to dismiss of Defendants Amazon.com, Netflix, Inc., Hulu, LLC, dated Jun. 27, 2016 (document 15, Case 4:16-cv-00243-MW-CAS).
Motion to dismiss of Defendants Amazon.com, Netflix, Inc., Hulu, LLC, dated Jun. 27, 2016 (document 18, Case 4:16-cv-00244-MW-CAS).
Exhibit 1 for Motion to dismiss of Defendants Amazon.com, Nettlix, Inc., Hulu, LLC, dated Jun. 27, 2016 (document 15-1, Case 4:16-cv-00243-MW-CAS).

(56) References Cited

OTHER PUBLICATIONS

Exhibit 1 for Motion to dismiss of Defendants Amazon.com, Netflix, Inc., Hulu, LLC, dated Jun. 27, 2016 (document 18-1, Case 4:16-cv-00244-MW-CAS).
Plaintiff's Opposition to Defendant's Motion to Dismiss, dated Jul. 11, 2016 (document 26, Case 4:16-cv-00244-MW-CAS).
Plaintiff's Opposition to Defendant's Motion to Dismiss, dated Jul. 11, 2016 (document 21, Case 4:16-cv-00245-MW-CAS).
Reply in Support of Motion to Dismiss of Defendants Amazon.com, Netflix, Inc., Hulu, LLC, dated Jul. 22, 2016 (document 31, Case 4:16-cv-00244-MW-CAS).
Reply in Support of Motion to Dismiss of Defendants Amazon.com, Netflix, Inc., Hulu, LLC, dated Jul. 22, 2016 (document 27, Case 4:16-cv-00245-MW-CAS).
Exhibit A for Reply in Support of Motion to Dismiss of Defendants Amazon.com, Nefflix, Inc., Hulu, LLC, dated Jul. 22, 2016 (document 31-1, Case 4:16-cv-00244-MW-CAS).
Exhibit A for Reply in Support of Motion to Dismiss of Defendants Amazon.com, Nefflix, Inc., Hulu, LLC, dated Jul. 22, 2016 (document 27-1, Case 4:16-cv-00245-MW-CAS).
US District Court Civil Docket: *Digital Media Technologies Inc* v. *Hulu Inc*; case 4:16cv245; filed Apr. 26, 2016.
US District Court Civil Docket: *Digital Media Technologies Inc* v. *Amazon.com Inc*; case 4:16cv244; filed Apr. 26, 2016.
US District Court Civil Docket: *Digital Media Technologies Inc* v. *Nettlix Inc*; case 4:16cv243; filed Apr. 25, 2016.
Non-Final Office Action issued in U.S. Appl. No. 14/717,216, filed May 20, 2015, dated Dec. 6, 2016.
Notice of Allowance issued in U.S. Appl. No. 14/887,490, filed Oct. 20, 2015, dated Dec. 8, 2016.
Liu et al.; Digital rights management for content distribution; Published in: Proceeding ACSW Frontiers '03 Proceedings of the Australasian information security workshop conference on ACSW frontiers 2003—vol. 21; pp. 49-58; 2003; ACM Digital Library.
Peinado; Digital Rights Management in a Multimedia Environment; Published in: SMPTE Journal; vol. 111, Issue: 4, Apr. 2002; IEEE Xplore.
Invalidity Contentions of Amazon.com, Inc. dated Oct. 14, 2016; *Digital Media Technologies, Inc.* v. *Amazon.com Inc.*; (Case No. 4:16-cv-00244-MW-CAS).
Amazon Exhibits A1-A21 to Invalidity Contentions dated Oct. 14, 2016.
Amazon Exhibits B1-B21 to Invalidity Contentions dated Oct. 14, 2016.
Non-Infringement Contentions of Amazon.com, Inc. dated Oct. 14, 2016; *Digital Media Technologies, Inc.* v. *Amazon.com Inc.*; (Case No. 4:16-cv-00244-MW-CAS).
Exhibit A to Non-Infringement Contentions of Amazon.com, Inc. dated Oct. 14, 2016.
Exhibit B to Non-Infringement Contentions of Amazon.com, Inc. dated Oct. 14, 2016.
Invalidity Contentions of Netflix, Inc. dated Oct. 14, 2016; *Digital Media Technologies, Inc.* v. *Netflix Inc.*; Case No. 4:16-cv-00243-MW-CAS.
Netflix Exhibits A1-A21 to Invalidity Contentions dated Oct. 14, 2016.
Netflix Exhibits B1-B21 to Invalidity Contentions dated Oct. 14, 2016.
Non-Infringement Contentions of Netflix, Inc. dated Oct. 14, 2016; *Digital Media Technologies, Inc.* v. *Netflix Inc.*; Case No. 4:16-cv-00243-MW-CAS.
Exhibit A to Non-Infringement Contentions of Netflix Inc. dated Oct. 14, 2016.
Exhibit B to Non-Infringement Contentions of Netflix Inc. dated Oct. 14, 2016.
Decision Institution of Covered Business Method Patent Review 37 C.F.R. § 42.208 dated Nov. 30, 2015; *Hulu, LLC, Netflix, Inc., Spotify USA Inc., and Vimeo, LLC* v. *iMTX Strategic, LLC*; Case CBM2015-00147.
Invalidity Contentions of Hulu, LLC dated Oct. 14, 2016; *Digital Media Technologies, Inc.* v. *Hulu, LLC*; Case No. 4:16-cv-00245-MW-CAS.
Hulu Exhibits A1-A21 to Invalidity Contentions dated Oct. 14, 2016.
Hulu Exhibits B1-B21 to Invalidity Contentions dated Oct. 14, 2016.
Non-Infringement Contentions of Hulu, LLC dated Oct. 14, 2016; *Digital Media Technologies, Inc.* v. *Hulu, LLC*; Case No. 4:16-cv-00245-MW-CAS.
Exhibit A to Non-Infringement Contentions of Hulu LLC dated Oct. 14, 2016.
Exhibit B to Non-Infringement Contentions of Hulu LLC dated Oct. 14, 2016.
US District Court Civil Docket U.S. District—Florida Northern (Tallahassee); Case No. 4:16cv244; *Digital Media Technologies Inc* v. *Amazon.com Inc*; Date Filed: Apr. 26, 2016; Retrieved from the court on Thursday, Nov. 3, 2016.
US District Court Civil Docket U.S. District—Florida Northern (Tallahassee); Case No. 4:16cv243; *Digital Media Technologies Inc* v. *Netflix Inc*; Date Filed: Apr. 25, 2016; Retrieved from the court on Friday, Nov. 4, 2016.
US District Court Civil Docket U.S. District—Florida Northern (Tallahassee); Case No. 4:16cv245; *Digital Media Technologies Inc* v. *Hulu Inc*; Date Filed: Apr. 26, 2016; Retrieved from the court on Friday, Nov. 4, 2016.
Appeal From The United States District Court for the Northern District of Florida in Cases Nos. 4:16-cv-00243-MW-CAS, 4:16-cv-00244-MW-CAS, 4:16-cv-00245-MW-CAS; Brief of Appellant; case: 17-2408; filed Dec. 11, 2017; pp. 1-127.
U.S. Circuit Court of Appeals docket for case 17-2408; *Digital Media Technologies* v. *Netflix, Inc.*; filed Aug. 9, 2017; pp. 14.

\* cited by examiner

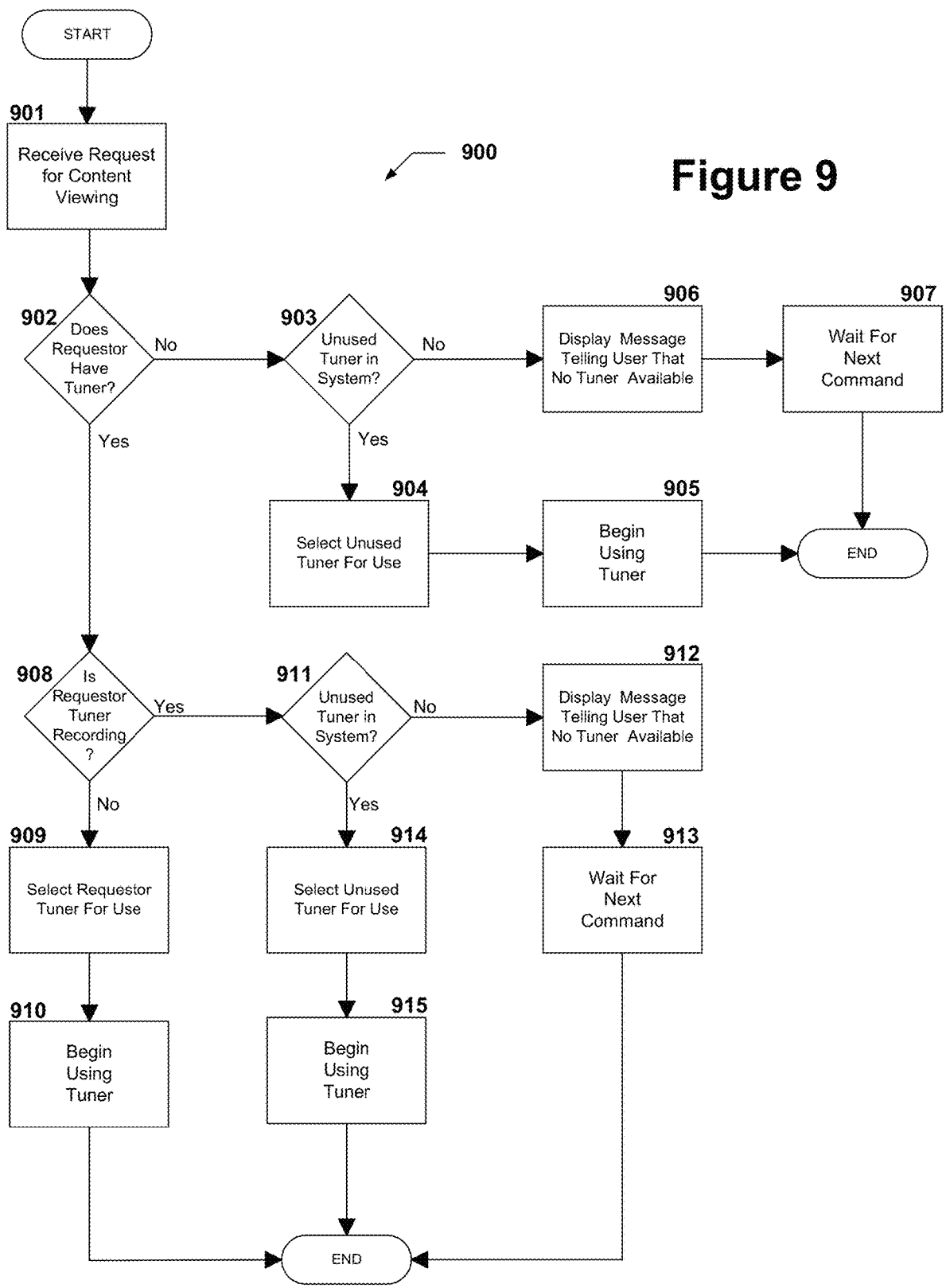

MULTIMEDIA NETWORK SYSTEM WITH CONTENT IMPORTATION, CONTENT EXPORTATION, AND INTEGRATED CONTENT MANAGEMENT

CROSS-REFERENCE TO RELATED APPLICATION

This is a divisional of, and claims priority to co-pending U.S. patent application Ser. No. 14/887,490, filed Oct. 20, 2015, which is a divisional of Ser. No. 14/725,171, filed May 29, 2015, which is a divisional of U.S. patent application Ser. No. 13/477,214, filed May 22, 2012, now U.S. Pat. No. 9,047,289, which is a divisional of U.S. patent application Ser. No. 13/422,518, filed Mar. 16, 2012, now U.S. Pat. No. 8,964,764, issued Feb. 24, 2015, which is a divisional of U.S. patent application Ser. No. 13/109,202, filed May 17, 2011, now U.S. Pat. No. 8,868,687, issued Oct. 21, 2014, which is a divisional of U.S. patent application Ser. No. 12/959,655, filed Dec. 3, 2010, which was a divisional of U.S. patent application Ser. No. 11/132,771, filed May 19, 2005, which claimed priority to U.S. Provisional Application Ser. No. 60/572,365, filed May 19, 2004, all of which are incorporated herein by reference in their entireties.

FIELD OF THE INVENTION

The present invention relates generally to the field of managing digital information and more particularly to the field of creating, importing, exporting, and accessing the digital information via networked multimedia systems.

BACKGROUND OF THE INVENTION

The possibility of downloading a quality movie via the internet, or some other data network, also called video on demand (VoD), using current broadband connections such as cable or DSL, has been simplified by the recent introduction of the H.264 (also known as MPEG-4 AVC) and Microsoft Windows Media Video 9 (WMV9) codecs. However, the issue of content protection (for the content being downloaded from the content provider) has been a major obstacle to allowing consumers to rent or purchase digital video disk (DVD) quality video via the internet, or some other data network. Thus, a system is needed which will provide protection for the content downloaded while, at the same time, will allow ease of use and convenience for the consumer.

One of the issues looming on the horizon is the potential use of a "broadcast flag" to protect broadcast digital TV content from being freely distributed to unauthorized parties. However, the "fair use" doctrine allows the consumer to record and reuse content which they own or receive. Using this criterion, a system could allow a user to transfer authorized content anywhere within the system network, including via a secure connection on the internet, for usage at the user's convenience.

Another important development has been the ability to record an incoming video stream in digitized form onto a mass storage device such as a hard disk drive, and playback that recorded video as desired by the user. This functionality has become known as a digital video recorder (DVR) or personal video recorder (PVR) and is viewed as a superior alternative to conventional video tape recorders for capture and subsequent playback of programming content. The DVR is located within the consumer's premises, and it typically may be used by two or more users.

Televisions have become so prevalent in the United States, that the typical household may have two or more television sets. Each television set requires its own DVR, if the consumer wishes to have access to the enhanced functionality. However, because DVRs can be expensive, users may be hesitant to purchase additional DVRs. These DVRs are typically configured as standalone units with limited ability to network or interconnect with other DVRs at the consumer's premises. In the cases where networking is available, the setup can be cumbersome and require considerable technical expertise and time to accomplish.

The current multimedia networking options are rather sparse and, for the most part, are PC centric and/or limited in the scope of options which they offer the user. Many multimedia products typically provide limited access to multimedia services and do not easily integrate with products providing different multimedia services or from different vendors. Some potential multimedia products such as digital cameras, video games, telephony and internet browsing have had limited adoption into multimedia systems. The ideal multimedia system would be based upon a distributed architecture and would appear as transparent as possible to the consumer.

The conversion to wireless communication will simplify the operation of and vastly increase the flexibility of multimedia networks. Upcoming wireless protocols such as IEEE 802.16, IEEE 802.11n, ultra broadband, and ultra wideband will advance this initiative tremendously. With these changes, the possibility of receiving and enjoying the maximum multimedia experience, even in a mobile environment, becomes much more attainable.

Therefore, a need exists for systems and methods that easily download quality video/audio and other content via the internet, or other data network, that have reliable and flexible content protection, that incorporate DVRs and that ease the use of multimedia networks. Specifically, there exists a need for systems and methods which allow multiple users operating discrete DVRs, or multimedia components, within a premise or vehicle to have access to quality video/audio content via the internet, or some other data network, received by and/or stored in another DVR or storage device. There also exists a need to provide a scaled down access client which can access all system content but at the same time be relatively inexpensive. A system is also needed which allows the content provider to have an interactive relationship with the user network to determine the license status of all content provided by that provider located on the network. An additional need is the ability to easily move content to a portable multimedia device or to a valid system device via the Internet, or other data network, for remote usage at the convenience of the consumer.

SUMMARY OF THE INVENTION

The invention provides a multimedia networking system. The invention utilizes various multimedia components networked together using either wired or wireless networking methods and protocols. This network also connects to the internet for retrieval and sharing of content. The system allows for parts of individual components to be shared with other components throughout the system to optimize the utilization of various components. The invention allows for the importation of content from an external content provider via the internet. This provides the opportunity for the user to download high quality movies, music, video games or other content for rental and purchase, through an easy and convenient process. This method also allows considerable flexibility for the content provider in the way the content is distributed and managed. The entire process is automated and very easy for the user to accomplish from any component in the system.

The invention allows the system to optimize the handling of content and more easily recover from the failure of system components. The system chooses the most efficient location and handling method for incoming and internally created content depending upon several factors including, but not limited to, processor utilization rate, processor speed, hard drive memory space available, fragmentation of data on hard drive, speed of hard drive data access, scheduled recording, quality of network connection and user preferences. Another important capability is being able to move content to different locations, so it is still available to users, when a component is being removed from the system. Another example of the system flexibility is the ability of the system to use any available tuner to view or record a program. This allows an opportunity to record more programs simultaneously and also allows more efficient use of available TV tuners.

The invention allows the access to the multimedia network to become virtually transparent to the user, whether within the confines where the main network resides or at a remote location connected via the internet, or some other data network. The user can freely import, create, and share content within the network.

The invention accepts various types of multimedia content such as analog video, analog audio, digital video and analog video. Some of these arrive in the form of TV input and may come in several varieties such as the analog NTSC or PAL broadcasts. Analog TV streams are converted to a H.264, WMV9, or MPEG2 formatted data stream, for efficient digital signal handling.

The system also accepts, digital TV forms such as Digital Satellite System (DSS), Digital Broadcast Services (DBS), or Advanced Television Standards Committee (ATSC). Another source is the playback of a DVD from a valid system device or streamed from an external DVD player.

The invention allows a digital camera to be connected to the system and then have the digital video from that digital camera stored within the system or streamed to any point in the system. The invention allows VoIP telephony using packet switching technology. The system can accept VoIP phone calls, accept messages, and give voice mail. The invention allows the importation and usage of video games. The games can be played by the use of emulation software or a hardware interface. The invention allows the user to connect the output from a radio tuner into the system which then allows the audio from that radio tuner to be streamed throughout the network. The radio tuner can also be adjusted remotely from anywhere in the system if it is type designed as system component.

The invention allows the use of an RFID tag to be used to automatically log the user into system via the use of an infrared ("IR") or radio frequency ("RF") remote control. The RFID tag referenced by the system for the user can be updated by the user if the user changes the RFID tag he or she is using. This change may be useful for security or if the original tag is lost or damaged.

The invention allows the user to control functions of the system from any component linked to the network and properly designated to access the network. These control functions may include importation of content, access to content, and handling of content. Among the handling options are the typical options available when viewing a digital video disk (DVD) such as fast forward, rewind, play, pause, fast/slow forward play and fast/slow reverse play.

It should be emphasized that the embodiments of the invention described above are merely possible examples, among others, of the implementations, setting forth a clear understanding of the principles of the invention. Other details and advantages of the invention will become apparent from the following detailed description in combination with the accompanying figures illustrating the principles and operation of the invention.

Many variations and modifications may be made to the above described embodiments of the invention without departing substantially from the principles of the invention. All such modifications and variations are intended to be included herein within the scope of the disclosure and invention and protected. In addition, the scope of the invention includes embodying the functionality of the preferred embodiments of the invention in logic embodied in hardware and/or software configured mediums.

Advantages of the Present Invention

1. The system comprises at least one multimedia server or multimedia storage server.
2. The system may have multiple multimedia servers.
3. The system may have multiple local multimedia clients.
4. The system may have multiple remote multimedia clients.
5. The system may have multiple multimedia storage servers.
6. The system may have multiple DVD/CD player/recorders.
7. The system may have multiple radio players.
8. The system may have multiple digital cameras.
9. The system may have multiple video game players.
10. The system may have multiple telephony transceivers.
11. Content may be generated within the system or received from an external source.
12. The system content may contain, but is not limited to, video data, audio data, digital images, video game software, and system data.
13. The system may accept content from non-system sources such as, but not limited to, digital camcorder, analog camcorder, digital camera, VCR, MP3 player, PDA, and/or a computer.
14. The system may accept local data input using protocols such as, but not limited to, Universal Serial Bus (USB) and Firewire.
15. The system may record programs from a television (TV) signal input for viewing at some future time.
16. The system may have a programming program guide to allow for easy selection of programs to be recorded.
17. All system components may share a single program guide via the system network.
18. The system may allow the recording schedule to be updated via the internet or other data network.
19. The system may allow viewing of Internet pages and access to internet page content.
20. The system may allow the use of an e-mail client for access to e-mail via the Internet or some other data network.
21. The system may have a virus protection program installed or available.
22. The system may provide voice over internet protocol (VoIP) or a similar type of telephony.
23. The system may automatically notify a user when a telephone call is received via the system.
24. The user may use the VoIP capabilities without the loss of access to any of other system functionality.

25. The system may automatically answer a phone call, received via the system, and accept voice mail.
26. The system may contain a system clock and a display clock.
27. The system clock may be automatically adjusted via the internet, or some other data network.
28. The system may allow user to adjust the display clock.
29. The display clock may be synchronized with the system clock at the command of the system or when display clock synchronization is done via the internet or some other data network.
30. The system may block usage of protected content if the system clock has been reset, by events such as system failure or programmatic adjustment, without connection to the internet, or some other data network, for time resynchronization of the system clock.
31. External content may be received via various transmission sources such as, but not limited to, RF sources like IEEE 802.16, ultra broadband, satellite, 3G, GPRS or TV antenna and terrestrial sources like cable or DSL (digital subscriber line).
32. The system may interact with a protected content provider Internet web server, or a comparable device, to test the connection speed and report to the user the estimated download time for the requested content, before the user has to choose to begin the download process.
33. The system may interact with the protected content provider Internet web server, or a comparable device, to automatically download content.
34. The system may interact with the protected content provider internet web server, or a comparable device, to automatically resume download when an interruption occurs.
35. The system may interact with the protected content provider Internet web server, or a comparable device, to adjust the time period for which the content license was originally granted.
36. The system may interact with the protected content provider internet web server, or a comparable device, to determine the license status of content previously supplied by that content provider.
37. The system may interact with the protected content provider internet web server, or a comparable device, to verify that the system device receiving content is a valid device type.
38. The system may interact with the protected content provider internet web server, or a comparable device, to update data within the software or hardware of the system, which may be used in a security algorithm for access to the content of that content provider.
39. The system may interact with the protected content provider internet web server, or a comparable device, to a renew content license without downloading the content again.
40. The system may interact with the protected content provider internet web server, or a comparable device, to limit the number of times protected content can be viewed.
41. The system may require both a valid device type and a valid content license to grant access to content for usage.
42. Content may be encrypted and/or locked and may allow decryption and/or unlocking, for use, when a correct security algorithm is used.
43. A security algorithm and/or data used to decrypt and/or unlock protected content may be embedded in the hardware of the system.
44. The system may use security protocols such as, but not limited to, VPN (virtual private network), WPA (WiFi Protected Access) and/or PKI (public key infrastructure).
45. When new system components are added, the system may automatically configure the new components in a fashion similar to "plug-and-play" and may require the user to login via the prompt on the new device display or to accept the new device via the prompt on the primary multimedia server display or the designated display for the multimedia storage server.
46. The system components communicate via wired protocols such as, but not limited to, ethernet and/or wireless protocols such as, but not limited to, IEEE 802.11, Bluetooth, or ultra wideband.
47. The system may comprise multiple multimedia servers, wherein one server is designated as the primary multimedia server.
48. The system may comprise additional multimedia servers, which can be considered secondary multimedia servers.
49. All secondary multimedia servers and multimedia storage servers may contain some data, which is duplicated from the primary multimedia server periodically, to allow the secondary multimedia server, or multimedia storage server, to be automatically reassigned as the system controller, if the original primary multimedia server is unexpectedly removed from the system.
50. If the primary multimedia server is removed from the system unexpectedly, the system may automatically reassign a secondary multimedia server as the new primary multimedia server, if a secondary multimedia server is available. The multimedia storage server can take system control, if a secondary multimedia server is not available.
51. The user may request removal of a multimedia server or a multimedia storage server from the system.
52. When requesting removal of a multimedia server or a multimedia storage server from the system, the system may allow transfer of content before removal from the system.
53. When requesting removal of the primary multimedia server, the system may verify the availability of and then assign system control to a new primary multimedia server or multimedia storage server.
54. The system may allow transfer of content within the system at any time, by the system user which owns content.
55. Remote multimedia clients may be different types and may contain video/audio, and/or audio and/or other data.
56. Remote multimedia clients may be detached from system for remote use of content.
57. Detached remote multimedia clients may allow unlimited use of unprotected content and usage of protected content for the time specified by and according to the guidelines specified by the content provider.
58. The remote multimedia client may prohibit access to protected content if the system clock is reset by events such as system failure or programmatic adjustment.
59. When it is reconnected to the system, the remote multimedia client may update the license status of all protected content which it contains, based upon information about the license status of the same protected content located in permanent storage locations within the system.
60. The system may communicate with and service requests from non-system devices, but those devices may have limited access to protected content.
61. The system may allow multiple user accounts to be created.

62. All content may be assigned to a user created account or may be assigned to the system default account.
63. All video content assigned to a system user may be viewed as a single consolidated list, viewed as content per server, sorted chronologically, or sorted using other user determined criteria.
64. The system may store preferences for each user such as, but not limited to, content view, language, or background theme.
65. When a request to store content is given, the system may select the most efficient location within the system to store that content based upon various criteria such as, but not limited to, processor utilization rate, processor speed, hard drive memory space available, fragmentation of data on hard drive, speed of hard drive data access, scheduled recording, quality of network connection, and user preferences.
66. The system may monitor the fragmentation of hard drive, or other mass storage device, and may prompt the user to conduct data defragmentation when it is determined to be advantageous.
67. The system may automatically schedule defragmentation, with user approval, based upon information such as, but not limited to, upcoming recording sessions, local time of day, typical usage patterns, and memory space available.
68. When scheduling more simultaneous recordings than the number of tuners which exist in the system, the system may prompt the user to approve the action.
69. The system may be able to receive both analog and digital television broadcasts from various sources such as, but not limited to, cable, satellite, and other RF sources.
70. The system may convert all analog television information to a digital format.
71. The system may recognize incoming digital video formats to avoid unnecessary conversion processes.
72. The system may encode and decode video information, as needed, to or from various digital video formats such as, but not limited to, MPEG2 (Motion Picture Experts Group-2), H.264 (also known as MPEG-4 AVC), and Microsoft Windows Media Video 9 (WMV9) depending upon user requests and system needs.
73. The system may store digital information on the hard drive, or appropriate mass storage device, located on a multimedia server, multimedia storage server, or other valid storage device.
74. The system components which receive an external television signal may convert that signal to an appropriate digital format and store the information on a storage media located somewhere within the system.
75. The system components which do not receive an external television signal may receive digital television information from another system device which has a television tuner available.
76. The local multimedia client preferably does not include mass storage space for content. If the local multimedia client does not have mass storage space for content, then the local multimedia client can be connected to the system to gain access to full system capabilities.
77. The local multimedia clients may or may not have a connection to receive a television signal from outside the system.
78. The digital video information, from a system component, which was previously stored, may then be sent to that system component, specified by the system, at the rate specified by the component receiving the information.
79. The multimedia server, the local multimedia client, the remote multimedia client, or the radio player may have multiple tuners.
80. The system may record multiple programs simultaneously by utilizing tuners which are not being utilized for recording at the current time.
81. Picture-in-picture capabilities may be provided by use of a second tuner in a single component or by the use of a tuner in another system component which is not being utilized at the current time.
82. The system may reconfigure protected content into a format which can be copied to permanent media such as, but not limited to, a DVD-R or CD-R, via a valid system device type.
83. The system may allow copying of protected content onto permanent media, such as a DVD-R or CD-R, within the parameters specified by the protected content provider.
84. The system may reconfigure content, for more efficient storage, on a remote multimedia client or may reconfigure unprotected content, for more efficient storage, on a non-system device which is external to the system.
85. Some content exchanged via system communications may be encrypted or modified to protect content.
86. The system may display various television standards such as, but not limited to, National Television Standards Committee (NTSC), PAL, and high definition (HD).
87. The system may display video as either interlaced scanned frames, progressive scanned frames, or other protocols, as desired.
88. The system may handle various audio formats such as, but not limited to, MP3, WAV, and AC3.
89. The system components may be controlled using an IR or RF remote control device.
90. The system may allow the user to use an RFID tag, or a similar device, to identify the user to the system, via the remote control, and automatically log the user into the system, if the user so chooses.
91. The system may allow the user to change the RFID tag, or similar device, at the request of the user.
92. A keyboard, keypad, or other input device may be used for inputting system functions and configurations.
93. The system may use a video game emulator front-end to allow access to video games.
94. Video camera input may be allowed from a system or a non-system device and may contain both audio information and video information.
95. The system may be configured to stream or transfer stored or live content, such as TV, radio, or digital video over the internet, or other data networks.
96. The system may be configured to stream or transfer protected content over the internet, or other data networks, to a valid system device using a secure connection protocol such as, but not limited to, VPN.
97. Recording schedules may be adjusted via the internet, or some other data network, or via a WAP enabled, or with comparable protocol, wireless phone.
98. The system may automatically create a copy of a content file if requests for access are determined to be causing a sufficient conflict in accessing the original content file.
99. The system may monitor status of connection to internet, or other external network, and may notify the user when a download process is interrupted and/or connection has been lost.
100. The system may allow the user, within the system, to reassign ownership of content to another user, within system, with the approval of the new owner.

101. The system may encode information into content which may then be used by system for security algorithms and/or license status information.
102. The system may allow user to exclude a system component from being automatically considered for usage as a tuner and/or data storage location.
103. The system may allow an administrative user account to be created.
104. The system may allow the administrative user to have access to all content, to move content, to make changes to individual user accounts, and/or have the ability to change system wide settings.
105. The system may authenticate the valid system device receiving content via the internet, or other data network, as part of the original system network sending the content.
106. Each system component contains its own hardware and/or software functionality but overall control of the system can be maintained by the primary multimedia server or multimedia storage server.
107. The system may interact with protected content provider internet web server, or a comparable device, to set the time period for which the content license is granted.
108. The system may allow instant messaging on system components with output display device.
109. The system component may allow for the display of two or more sources of video information on an output device.
110. The system may allow control of various system functions and/or content via the internet, or other data network, using a valid system device.
111. The system may monitor and record the number of times content is accessed.
112. The system may interact with protected content provider Internet web server, or a comparable device, to determine the number of times content has been accessed.
113. When requesting removal of the primary multimedia server, the system may allow the user to specify which secondary multimedia server to assign as the new primary multimedia server or may allow user to specify a multimedia storages server as the system controller.
114. The system may use a graphical user interface (GUI) for the components which have a visual media output device.
115. The system components which display video output or receive video, in a form requiring digitization, may have a video coder and/or decoder.
116. The system components which serve as storage devices, such as the multimedia servers and multimedia storage servers may have router capabilities.
117. The system may contain a web server to provide access to send data to and receive data from the Internet.
118. The system may allow data stream to flow from incoming input/output (I/O) to outgoing I/O when user is viewing video or listening to audio in real time.
119. The system may allow usage of different port numbers for input and output of data to and from system devices.
120. In one exemplary embodiment, the multimedia storage server does not comprise a tuner.
121. The system may allow user to query and display the status of protected content.
122. The current status of protected content on the system may be stored in an extensible markup language (XML) file, or a similar format file.
123. Local multimedia clients may have mass storage space sufficient to run the operating system and related software.
124. The DVD/CD player/recorder may be in same enclosure as a multimedia server or multimedia storage server.
125. The content key may contain information which is stored in an XML file, or a similar format file.
126. The system may allow a multimedia storage server as the system controller, even when a multimedia server is available within the system.
127. The system may allow for the periodic generation of a new private key within a system device for purposes of enhanced security.
128. The system may allow for the generation of new private key within a system device using a seed from a random number generator or some other source.
129. The system may allow compilation and storage of content usage history in a file called content usage history file.
130. The system may allow multiple content usage history files to be created by the use of specific criteria, such as usage for daily intervals or weekly intervals or usage for individual system users.
131. The system may allow deletion of selected content usage history from the content usage history file when the appropriate content provider has retrieved that information and given permission for the deletion of the data.
132. The system may allow compilation and storage of the license status of content in a file called content license status file.
133. The system may allow the conversion of all encrypted content keys, content usage history files and content license status files contained within a system device, from an old public key to new public key, when a new private key is generated within that system device.
134. The system may include an additional level of validation for a valid system device logging into system via the internet, or some other data network.
135. The system may allow encryption of live content if needed.
136. The system may incorporate the point-to-multipoint (PMP) wireless protocol to enhance the data distribution within the system.
137. The system may allow streaming content from an external provider to be stored on a storage device for a short period of time during the streaming process to improve the quality of the streaming content.
138. The system may have an interactive program guide, which can search for content from various sources and display the content available in a consolidated format to simplify the choice of programming to view, record, and/or import.
139. The system may allow information to be compiled and stored in the content license status file, relating to the network identification, user identification, and device identification to which each piece of content is assigned.
140. The system may include a web server which can be used to provide secure access to the system, from a valid system device or non-system device, via the internet.
141. The system may include the use of an additional means of user identification, such hardware containing a security certificate, for a user accessing the system via the internet, or other data network.
142. Each system device may include an operating system but overall system control is given to a designated primary multimedia server or multimedia storage server.
143. Each system device may include multiple processors to improve operating efficiency.
144. The system may allow flow of data within system to reduce contention and improve the efficiency of data exchange and data usage.

BRIEF DESCRIPTION OF THE DRAWING FIGURES

FIG. 9 is a flow chart showing the process for a request to find a television tuner in accordance with an exemplary embodiment of the present invention.

DETAILED DESCRIPTION OF THE PREFERRED EMBODIMENTS

Figure 1:
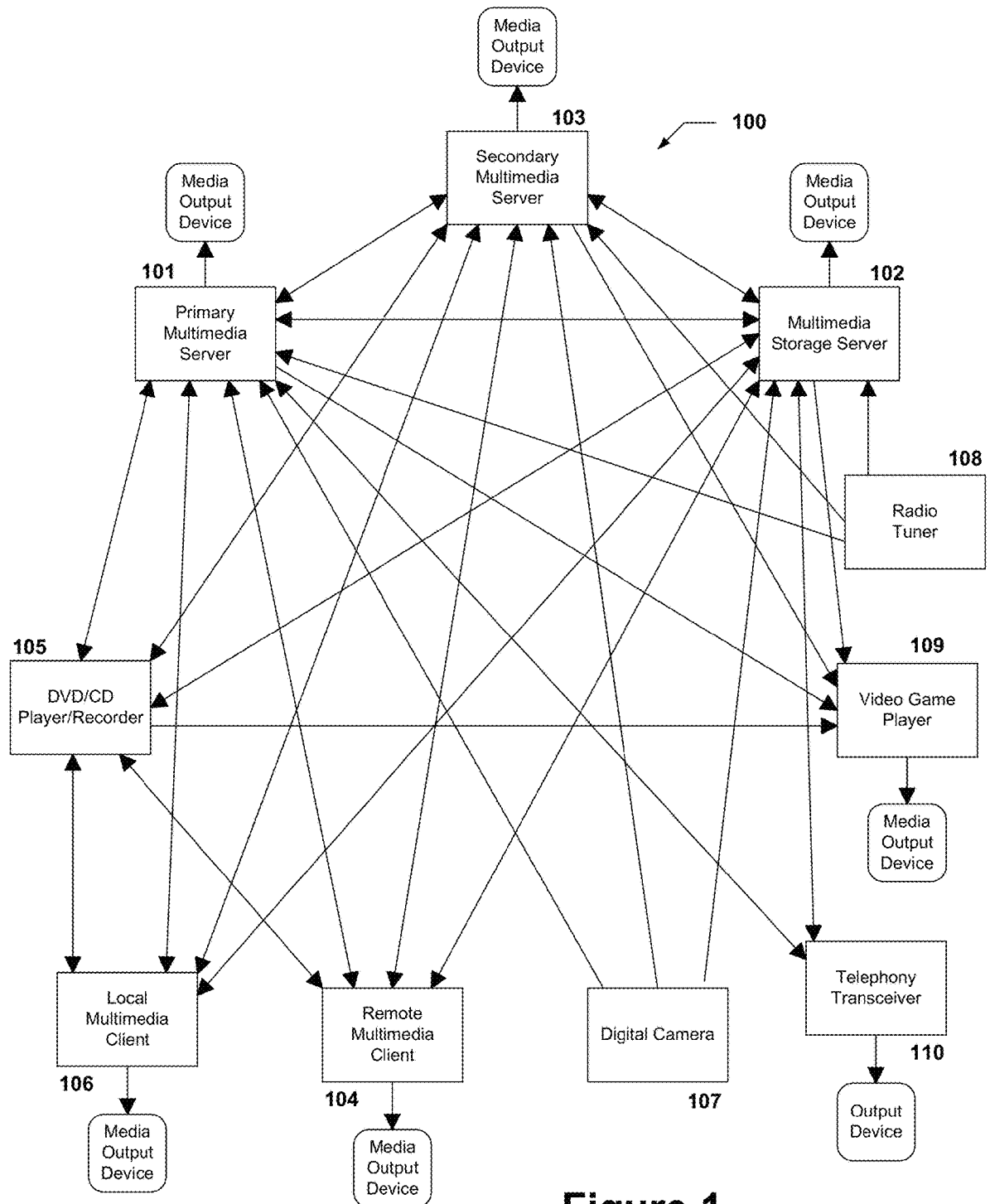
FIG. 1 is a block diagram representation of a multimedia system according to an illustrative form of the present invention showing the content flow between components within the system.

Referring now to the drawing figures, in which like reference numbers refer to like parts throughout the several views, preferred forms of the present invention will now be described by way of example embodiments. It is to be understood that the embodiments described and depicted herein are only selected examples of the many and various forms that the present invention may take, and that these examples are not intended to be exhaustive or limiting of the claimed invention. Also, as used in the specification including the appended claims, the singular forms "a," "an," and "the" include the plural unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As described herein, the term "content" is used to describe the data and/or files that are imported, exported, and/or managed within the system. Such content can include audio files, video files, and video game programs.

The present invention is embodied in a networked multimedia system which can import content via the internet, or other data network and create content within, from various sources, such as TV, radio and digital camera. The present invention allows for multiple user accounts, including an administrative account, to be created and allows content to be assigned to specific users. An administrative account can control all system preferences and move or reassign ownership of any content. For example, content assigned to a specific user is not visible to other users, but any user can reassign content ownership, with the approval of the recipient.

The present invention allows the content provider to access and update the status of content, located within the system, which the provider of the content has previously supplied.

The present invention allows for transmission of data between the various system devices and also with other non-system devices. Transmission media include coaxial cables, copper wire, and fiber optics. Transmission media can also take the form of acoustic or light waves, such as those generated during radio wave and infrared data communications.

FIG. 1 is a block diagram of a system 100 showing the pathways for sending and receiving content within the system 100. The system 100 comprises a plurality of system components. Each system component preferably includes a processor unit and a software program to control that component, or other components as desired. All data within the system is preferably in digital form or converted into digital form. Data is exchanged in the form of data packets and/or frames, depending upon the communication protocol being used.

The system 100 includes a primary multimedia server 101, a secondary multimedia server 103, a multimedia storage server 102, a remote multimedia client 104, and a DVD/CD player/recorder 105. Each of these devices preferably has some type of storage media such as, but not limited to, a hard disk drive, DVD-R/CD-R, or DVD-RAM. The system 100 also includes a local multimedia client 106, which preferably does not have content storage media but can include memory for program usage.

Preferably, the remote multimedia client 104 is a portable device that can be detached from the system 100. The detached remote multimedia client 104 allows access to all content stored on it, including protected content such as DVD quality movies, which have been imported via the internet from a remote location. Thus, content stored on the remote multimedia client 104 can then be accessed by the user at his or her convenience and at his or her preferred place of viewing and/or listening.

In an exemplary embodiment, the primary multimedia server 101, the secondary multimedia server 103, the remote multimedia client 104, and the local multimedia client 106 each can have the ability to send and receive TV signals. The primary multimedia server 101, the secondary multimedia server 103, the remote multimedia client 104, and the local multimedia client 106 can each include at least one encoder/decoder capable of working with at least one TV format (such as NTSC, PAL, and HD). Having multiple encoders is less important than having multiple decoders because a single encoder, which is efficient and compatible with the system 100, can be used while achieving one of the goals of the present invention. Preferably, each decoder is operable to handle multiple codecs because content may come from different sources such as DVDs, movie downloads, or internally generated content. Codecs can be hardware or software based. Hardware based codecs, such as a dedicated digital signal processor (DSP) or field programmable gate arrays (FPGA), may be faster and require less processor intervention but may offer less flexibility on which codecs are available. The flexibility of the software based codecs are a high priority but must be balanced against the cost and complexity of the processor which may be desired. Alternatively, multiple decoders each can operate to handle a single codec, or a few codecs can be incorporated into each of the primary multimedia server 101, the secondary multimedia server 103, the remote multimedia client 104, and the local multimedia client 106.

Preferably, either the primary multimedia server 101 or the multimedia storage server 102 maintains primary control over the other system components. This control can be accomplished by running a software program on the primary multimedia server 101 (if the primary server is to maintain control) or on the multimedia storage server 102 (if the multimedia storage server 102 is to maintain control). The server in control can assign control to other system components for specific tasks, such as streaming data or moving data files. Preferably, the secondary multimedia server 103 is running a similar core program to the program running on the control server but the secondary multimedia server program relies upon the control server to direct which operations and functions for which the secondary multimedia server 103 is responsible. The secondary multimedia server 103 can also contain some data and files duplicated from the control server which allows the secondary multimedia server 103 to become the primary multimedia server 101, if the primary multimedia server (if control server) or the multimedia storage server 102 (if control server) is unexpectedly removed from the system.

The system 100 can have various analog or digital devices connected to it. Such devices can include, but are not limited to, a digital camera 107, a radio tuner 108, a video game player 109, and a telephony transceiver 110.

The digital camera 107 can be connected to the system 100 and can send output (i.e., digital pictures or digital video) to the primary multimedia server 101, the secondary multimedia server 103, or the multimedia storage server 102. The digital images from the camera 107 can then be stored in any of the server's storage media and sent to another system component or a non-system device, such as a web page accessed via the internet.

The radio tuner 108 can also be connected to the system 100 and can send output to the primary multimedia server 101, the secondary multimedia server 103, or the multimedia storage server 102. The audio data can then be stored in any of the server's storage media and sent to another system component, for example to the media output device of a system component which could be a TV or a headphone output from a remote multimedia player. Then the audio data be stored and sent to yet another system component (such as remote multimedia player, multimedia server or multimedia storage server) or non-system device, such as to a web page accessed via the internet.

The video game player 109 can be connected to the system 100 and can access game software stored within the system 100 to allow the user to play video games using an emulation interface or a hardware interface. The video game player 109 can download the game software from the system 100 (i.e., a one-way communication) or use the game software which is still stored on another system device (i.e., a two-way communication), depending on the configuration which is most advantageous.

The telephony transceiver 110 can be connected to the system 100 and can receive VoIP phone calls via software running on the primary multimedia server 101 (if control server) or the multimedia storage server 102 (if control server). The VoIP uses packet switching to send and receive data, which is converted to or converted from an audio conversation. The system can automatically notify user of an incoming phone call and then allows the user to answer the call or accept voice mail from the caller. Preferably, the voice mail greeting is recorded in a digital format. The greeting is then sent in digital format, via the internet, to the caller where it is converted to an analog audio format for the caller to hear. The caller then provides a message in analog audio, which is converted to digital format and sent, via the internet, back to the system for storage. The system accepts and stores the caller's message in a digital form, which can later be accessed by the user.

Figure 2:
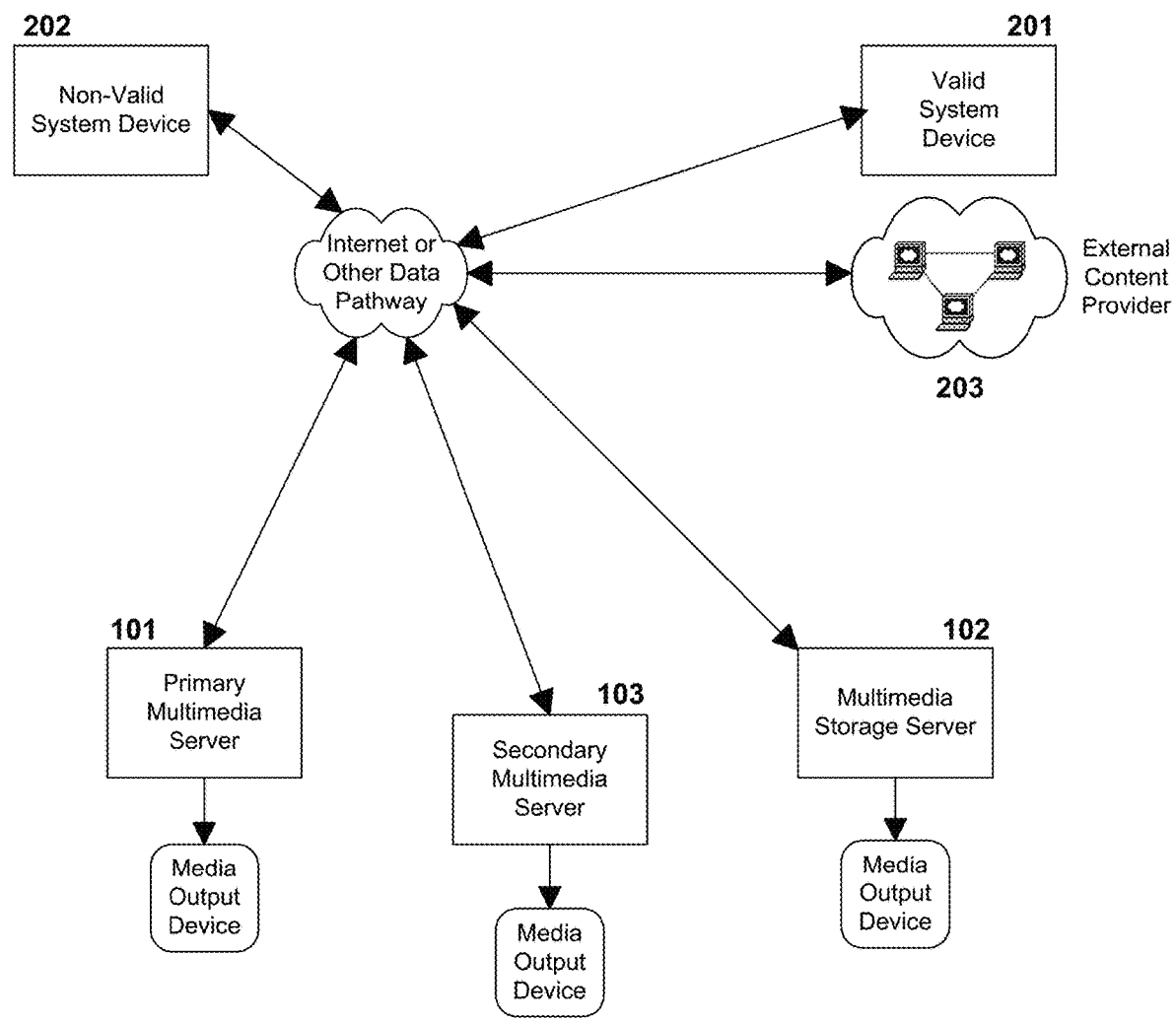
FIG. 2 is a block diagram showing flow between components within the system of FIG. 1 and components external to the system.

FIG. 2 is a block diagram showing the pathways for content sent or received from components external to the system 100. Typically, there can be two kinds of external components: valid system devices 201, which can access protected content, and non-valid system devices 202, which cannot access protected content. The valid system device 201 can be any system device capable of accessing the Internet, or other data network, which is recognized by the system as a valid system device. Exemplary valid system devices 201 include any system any system component shown in FIG. 1 that can provide proper validation credentials to the system. The system 100 can verify that the component is a valid system device 201 by using an algorithm which is located in the software and/or hardware of the component. Preferably the valid system device 201 is capable interacting with the system 100 to access system functionality such as sending content to system, receiving content from the system, and performing system administrative functions. The non-valid system device 202 is a device which can interact with the system to perform only certain functions. Preferably, a non-valid system device can access the internet, but it cannot provide proper validation credentials to the system. Thus, the non-valid system device cannot gain access to protected content. Exemplary non-valid system devices include a cellular phone which can modify the recording schedule, a MP3 player, which can store unprotected content from the system, and a computer, which can store and access unprotected content from the system.

An external content provider 203 can be connected to the system 100 and can send content to various system components. The external content provider 203 can interact directly with system components to determine and modify the status of content that the provider has supplied. The external content provider 203 can verify that the system component receiving content is a valid system device 201 which assures that the protected content is not available to unauthorized parties or devices. The external content provider 203 can also test the connection speed and report to the user the estimated download time for requested content, before the user chooses to begin the download process. Alternately, the external content provider 203 can automatically download content and automatically resume download when an interruption occurs. Additionally, the external content provider 203 can adjust the time period for which the content license was originally granted, can verify that system device receiving content is valid device type, can update data within the software or hardware of the system 100, which may be used in a security algorithm for access to the content of that content provider, can renew the content license without downloading the content again, and can limit the number of times protected content can be viewed.

Preferably, the primary multimedia server 101 (if control server) or the multimedia storage server 102 (if control server) handles all content sent or received from external sources. Alternately, the secondary multimedia server 103 or the multimedia storage server 102 can handle all content sent or received from external sources. Preferably, the primary multimedia server 101, or multimedia storage server 102 manages the transfer of content and can also transfer control for specific transfer tasks to the secondary multimedia server 103.

Figure 3:
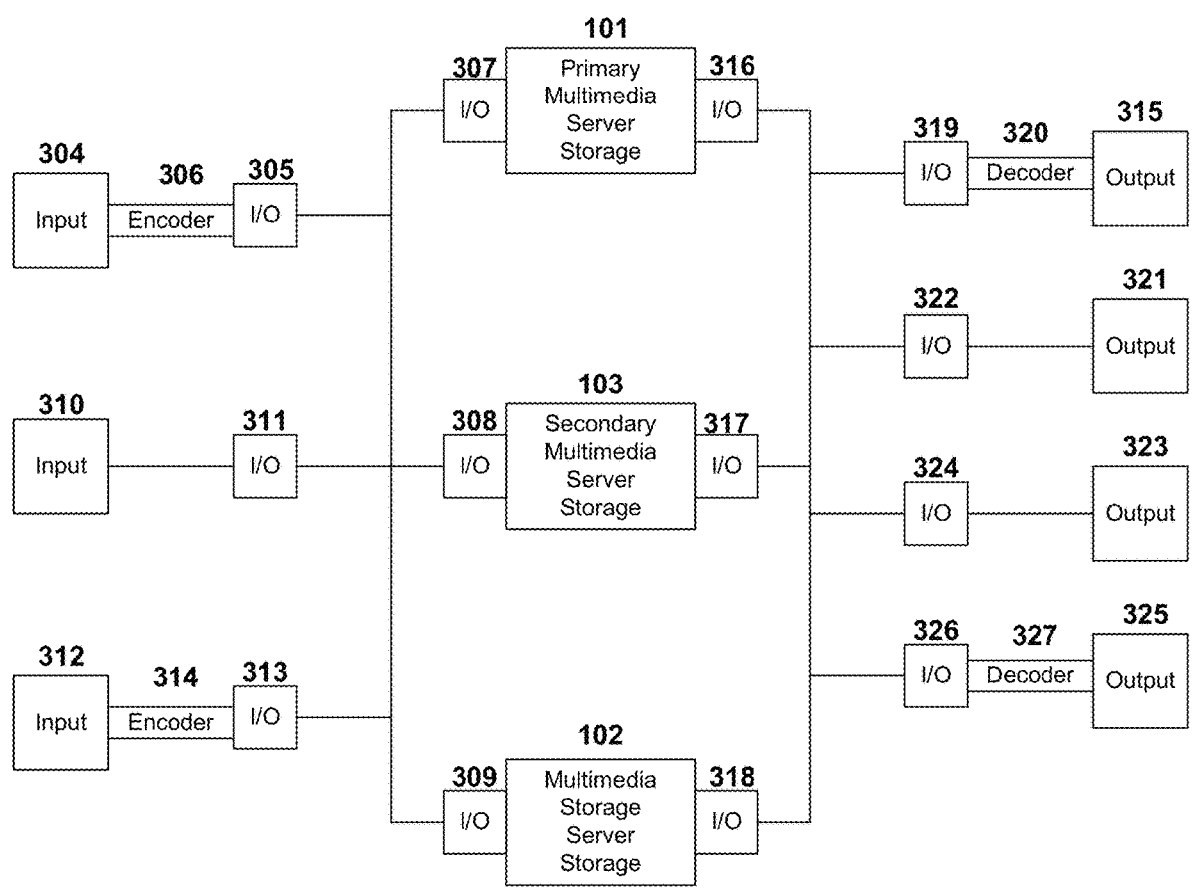
FIG. 3 is a block diagram showing the handling of input/output functions within the system of FIG. 1.

FIG. 3 depicts a block diagram showing the handling of content which is generated or handled within the system 100 according to an exemplary embodiment. It should be noted that the input and output functionality examples used can be located within any system component. It should also be noted that even though FIG. 3 shows three inputs and four outputs, any number of devices can provide input, as well as any number of output devices can receive output from the system. It should be noted that the primary multimedia server 101, the secondary multimedia server 103 and the multimedia storage server 102 can have storage devices for storing content generated within the system 100 for any input or output.

In this exemplary embodiment, the source of input 304 is an analog TV signal. When the primary multimedia server 101 (if control server) or the multimedia storage server 102 (if control server) gives I/O 305 a proper command, the I/O 305 begins sending the output from an encoder 306 to an I/O 307 (which supplies input to the primary multimedia server 101) or I/O 308 (which supplies input to the secondary multimedia server 103) or I/O 309 (which supplies input to the multimedia storage server 102) for storage. The choice of which device will receive the input for storage is determined by the program running on the primary multimedia server 101 or multimedia storage server 102, based upon a predetermined algorithm.

The source of input 310 is a digital TV signal. When the primary multimedia server 101 (if control server) or the multimedia storage server 102 (if control server) gives I/O 311 a proper command, the I/O 311 begins sending the signal from input 310 to I/O 307 or I/O 308 or I/O 309 for storage. The choice of which device will receive the input for storage is determined by the program running on the primary multimedia server 101 or multimedia storage server 102, based upon a predetermined algorithm.

The source of input 312 is an analog audio signal. When the primary multimedia server 101 (if control server) or the multimedia storage server 102 (if control server) gives I/O 313 a proper command, the I/O 313 begins sending the output from an encoder 314 to I/O 307 or I/O 308 or I/O 309 for storage. The choice of which device will receive the input for storage is determined by the program running on the primary multimedia server 101 or multimedia storage server 102, based upon a predetermined algorithm.

The output from output 315 is an analog TV signal. When the primary multimedia server 101 (if control server) or the multimedia storage server 102 (if control server) gives I/O 316 or I/O 317 or I/O 318 the proper command, the I/O 316 or I/O 317 or I/O 318 begins sending the output to the I/O 319 which then forwards the data to the decoder 320 which then sends the decoded TV signal to the TV via output 315. The choice of which device will be the source of the data is determined by the program running on the primary multimedia server 101 or multimedia storage server 102, based upon a predetermined algorithm.

The output from output 321 is a digital TV signal. When the primary multimedia server 101 (if control server) or the multimedia storage server 102 (if control server) gives I/O 316 or I/O 317 or I/O 318 the proper command, the I/O 316 or I/O 317 or I/O 318 begins sending the output to the I/O 322 which then sends the signal to the digital TV via output 321. The choice of which device will be the source of the data is determined by the program running on the primary multimedia server 101 or multimedia storage server 102, based upon a predetermined algorithm.

The output from output 323 is a digital audio signal. When the primary multimedia server 101 (if control server) or the multimedia storage server 102 (if control server) gives I/O 316 or I/O 317 or I/O 318 the proper command, the I/O 316 or I/O 317 or I/O 318 begins sending the output to the I/O 324, which then sends the signal to the device connected to output 323. The choice of which device will be the source of the data is determined by the program running on the primary multimedia server 101 or multimedia storage server 102, based upon a predetermined algorithm.

The output from output 325 is an analog audio signal. When the primary multimedia server 101 (if control server) or the multimedia storage server 102 (if control server) gives I/O 316 or I/O 317 or I/O 318 the proper command, the I/O 316 or I/O 317 or I/O 318 begins sending the output to the I/O 326 which then forwards the data to the decoder 327 which then sends the decoded audio signal to the device connected to output 325. The choice of which device will be the source of the data is determined by the program running on the primary multimedia server 101 or multimedia storage server 102, based upon a predetermined algorithm.

Figure 4A:
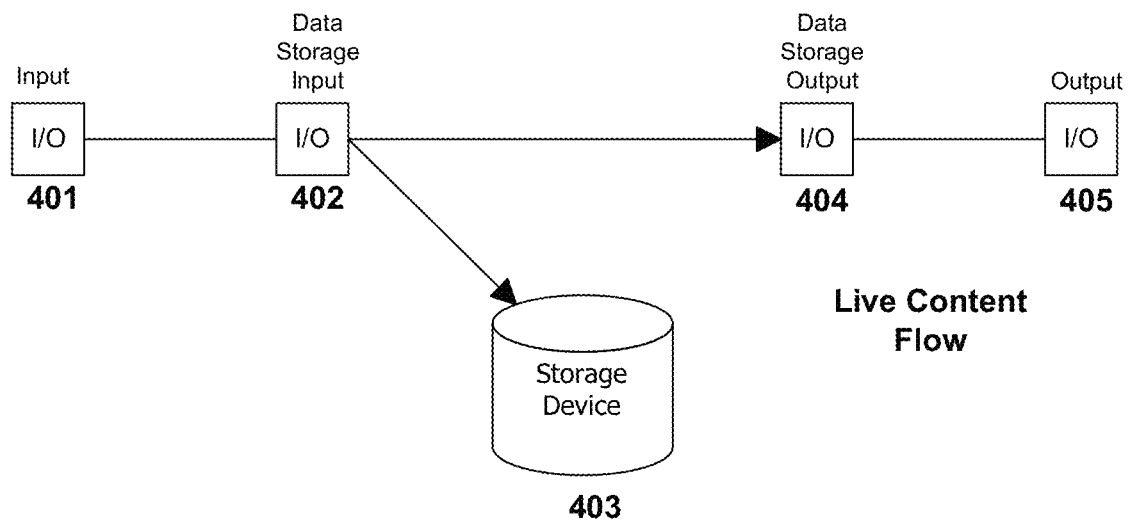
FIGS. 4A and 4B are block diagrams showing the flow of live and delayed content in the system of FIG. 1.

FIG. 4A depicts a block diagram showing the flow of live content. I/O 401 sends a data stream being generated by a system device (i.e., a valid or non-valid system device), such as a TV tuner, radio tuner or digital camera, to I/O 402. The I/O 402 determines whether data stream from I/O 401 is live or delayed based upon information from the system software. The system software determines this status based upon whether the user is choosing to delay content or view it live. Preferably, if the content is viewed live, then an identical data stream is sent to storage device 403, to be saved on a storage media, and to I/O 404. The data is then sent directly from I/O 404 to I/O 405. The data is then sent from I/O 405 to the appropriate output device, such as a TV or audio amplifier. Preferably, the I/O 402 and I/O 404 are both parts of the I/O of a system component but are separated in FIGS. 4A and 4B to clarify that the signal source going to I/O 404 can vary depending upon whether the content is being viewed live or delayed.

Figure 4B:
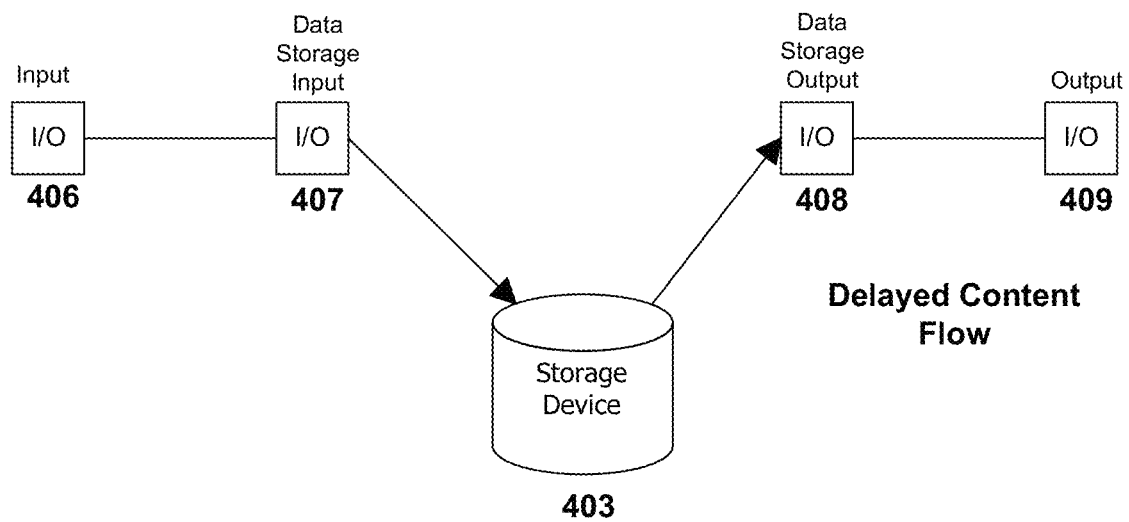

FIG. 4B depicts a block diagram showing the flow of delayed content. The flow of content differs from that displayed in FIG. 4A if the system software determines that the user chooses to view the content later in time. In this case, I/O 406 sends a data stream generated by a system device (i.e., a valid or non-valid system device), such as a TV tuner, radio tuner or digital camera, to I/O 407. Since the content is being delayed, the data stream is sent to storage device 403, to be saved on a storage media. The delayed content, which was previously stored from the data stream, is then sent to I/O 408 in the direction (forward or reverse) and frame rate specified by the user while the storage device continues to save the live content stream if there is still a live stream. The delayed content is then sent from I/O 408 to I/O 409. The delayed data is then sent from I/O 409 to the appropriate output device, such as a TV or audio amplifier.

If the user chooses to return to the live content viewing option, then the data flow path will revert to the direct path from I/O 402 to I/O 404, as described earlier in the live content flow method.

Figure 5:
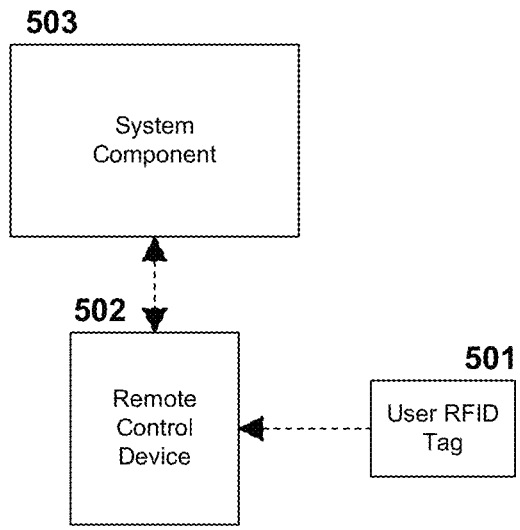
FIG. 5 is a block diagram showing use of a RFID tag to verify user identification in accordance with an exemplary embodiment of the present invention.

FIG. 5 depicts a block diagram representation of user authentication using an RFID tag 501. Preferably, the RFID tag 501 automates a login via a remote control 502. The RFID tag 501 emits a signal which is detected by the remote control 502. The remote control 502 receives the login information, in the signal from the RFID tag 501, and transmits that information to the system component 503, which can be the remote control. The system component 503 then uses that information to authenticate the user and log the user into the system 100 or perform whatever predetermined functions are specified by the user. Alternatively, other forms of user authentication, including the use of user identification and a password, biometric login methods or any combination of these measures, can also be used.

Figure 6:
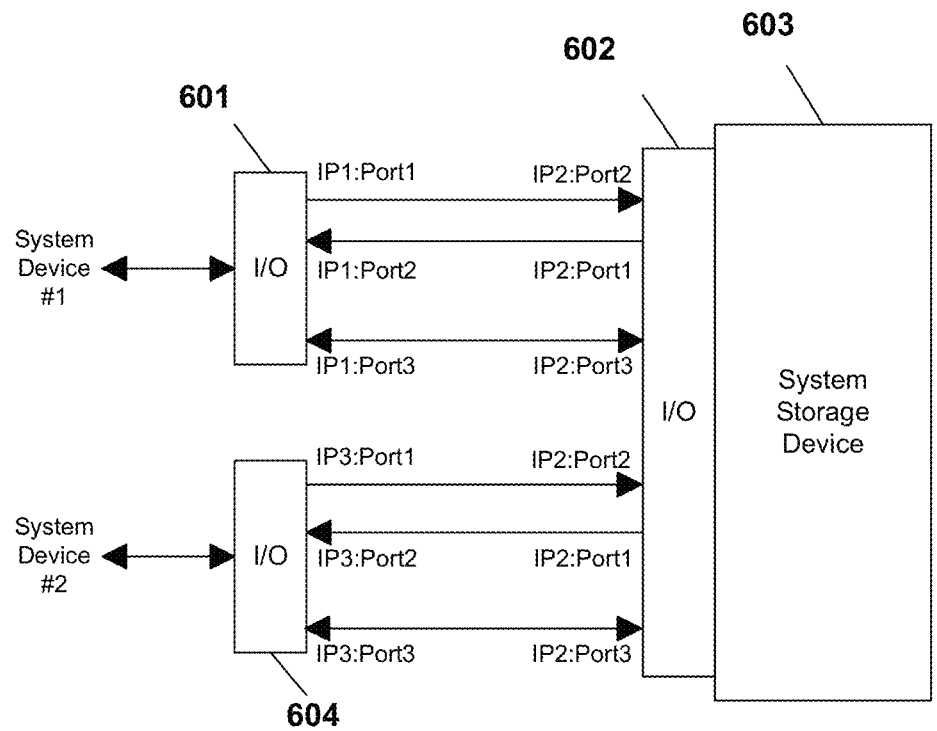
FIG. 6 is a block diagram showing use dual data ports for sending and receiving data in accordance with an exemplary embodiment of the present invention.

FIG. 6 shows the use of multiple ports for handling of input/output. The I/O 601 sends data on IP1:Port1 (IP address 1:Port 1—an example could be 1111.1111.1111.0001:0001), receives data on IP1:Port2 and handles all system control communications on IP1:Port3. The I/O 602 is the I/O section of the system storage device 603. The I/O 602 uses IP2:Port2 to receive data, IP2:Port1 to send data and handles all system control communications on IP2:Port3. The I/O 604 sends data on IP3:Port1, receives data on IP3:Port2 and handles all system control communications on IP3:Port3. Using this configuration throughout the system allows all devices to consider data on port 1 as outgoing data, data on port 2 as incoming data and all data on port 3 as system control. This can help simplify data handling and movement within the system.

Figure 7:
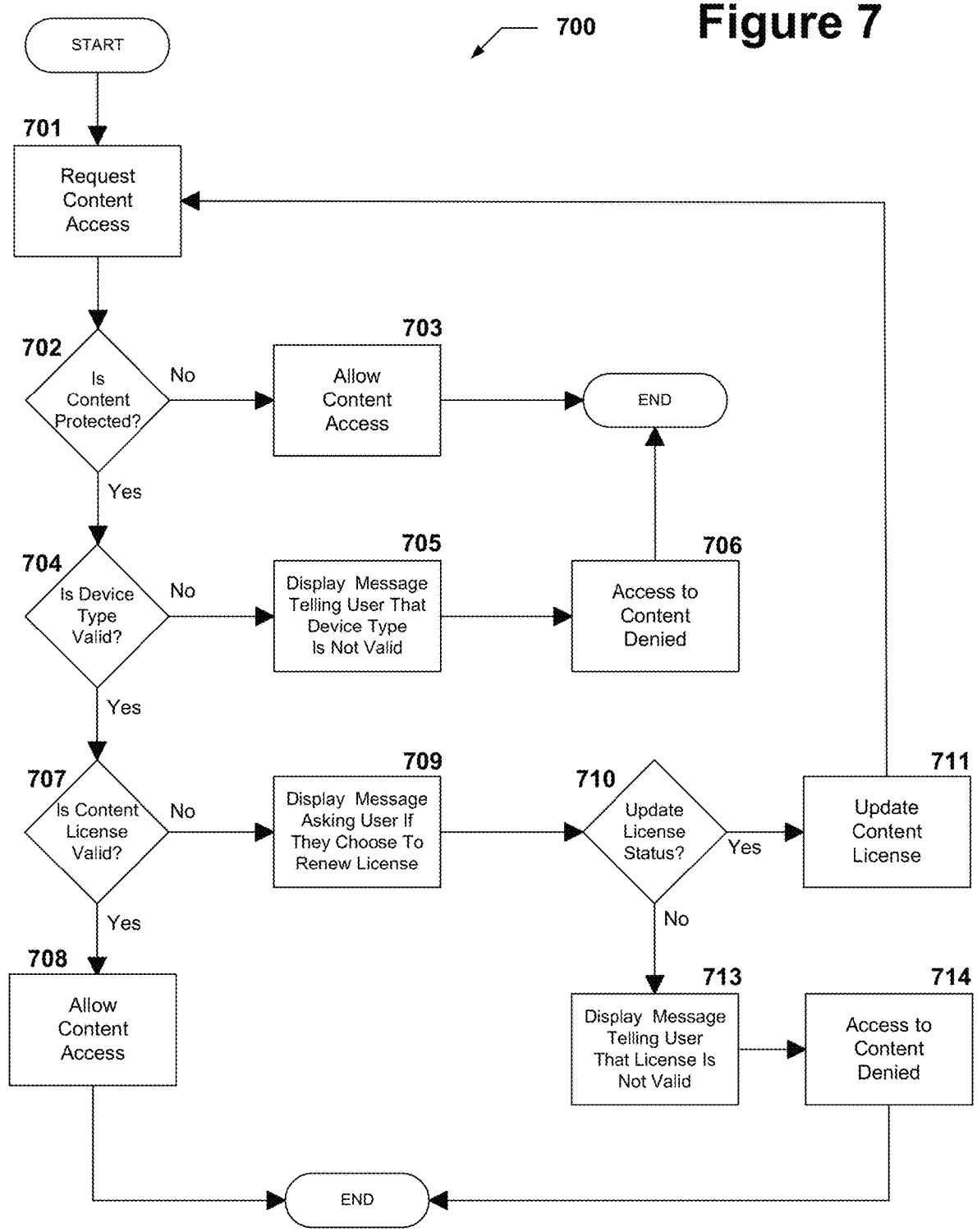
FIG. 7 is a flow chart showing the process for a request for content access in accordance with an exemplary embodiment of the present invention.

FIG. 7 shows a flowchart representation of a process 700 for requesting access to content. Beginning at step 701, the user requests access to content, such as via the remote control. At step 702, the system 100 determines if the content requested is protected content. If the system 100 determines, at step 702, that the content is not protected, then the system 100 allows access to the content by any valid system device or non-valid system device without restriction at step 703, and the process 700 ends. If the system 100 determines, at step 702, that the content is protected, then the system determines at step 704, if the device type requested is a valid device type.

If the system 100 determines that device type is not a valid device type, then at step 705, the system displays a message to the user that tells the user that device is not valid. Thus, access is denied at step 706, and the process 700 ends. If the system 100 determines that the device is a valid device, then the process 700 proceeds to step 707.

At step 707, the system 100 determines whether the license for the content is valid. If at step 707, the system 100 determines that the license is valid, then full access to the content is granted on the system device at step 708. If, however, at step 707, the system 100 determines that the license is not valid, then the process 700 proceeds to step 709 and displays a message to the user asking the user to choose whether to renew the license. The process 700 proceeds to step 710, where it determines whether input has been received to update the status of the license. If input has been received to update the status of the license, then the system 100 updates the license at step 711, and loops back to step 701. If, however, the system 100, at step 710, determines that no input has been received to update the license (or if input has been received not to update the license), then the system 100 displays a message at step 713 to the user stating that the license is not valid and denies access to the content at step 714. The process 700 then ends.

Figure 8:
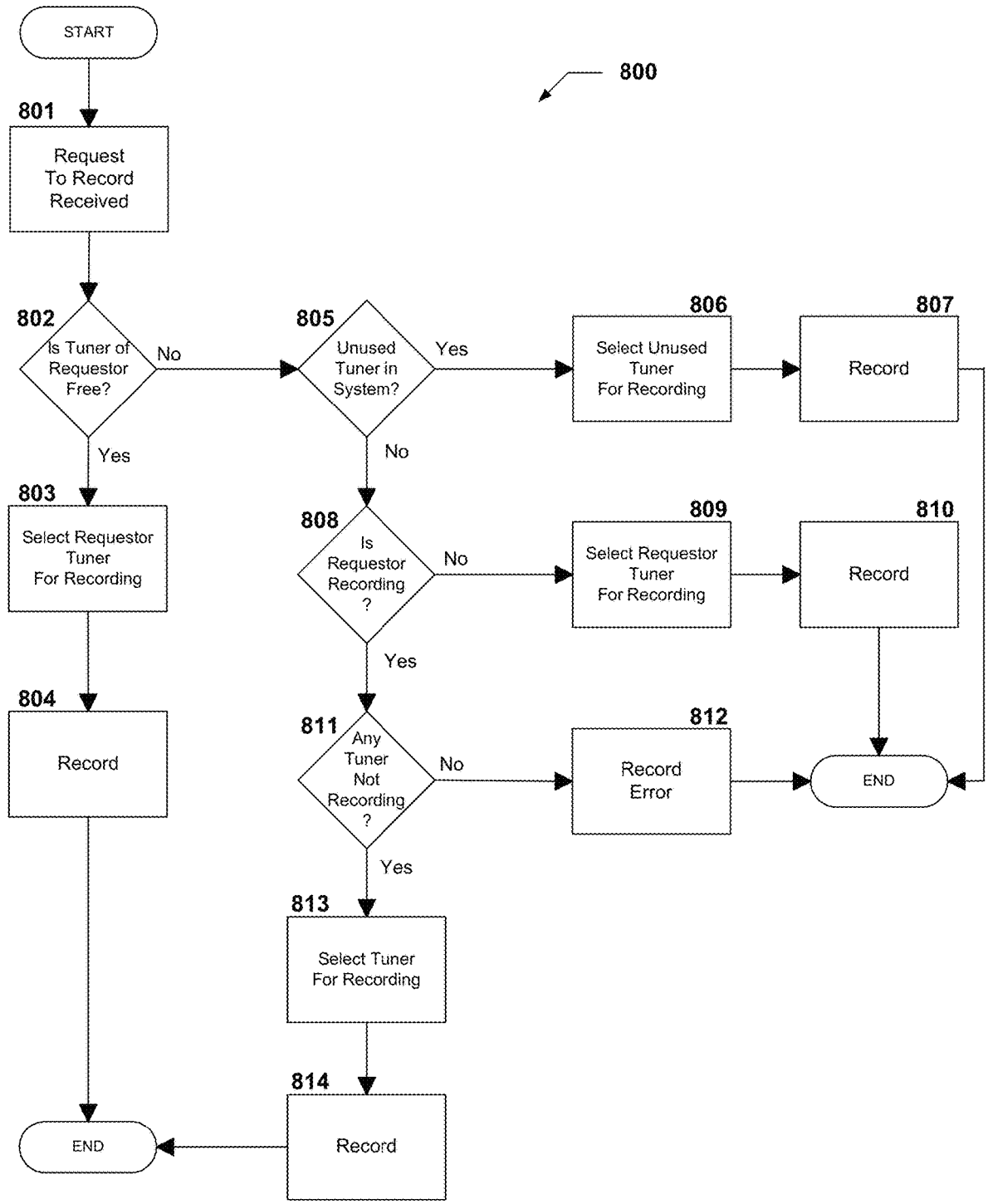
FIG. 8 is a flow chart showing the process for a request for a record in accordance with an exemplary embodiment of the present invention.

FIG. 8 shows a flowchart representation of logic 800 used in determining which tuner should be used for a recording process. Beginning at step 801, a request to record is received from a system component. At step 802, the system 100 determines whether the tuner of the system component requesting the recording is available. If the tuner is available (i.e., a tuner is available when it is not being used by the system for another purpose, such as viewing or recording) at that time, the tuner is selected to record at step 803, and the recording of the content begins at step 804. If, however, the system 100 determines that the tuner of the system component requesting the recording is not available, then the system determines whether an unused tuner is available elsewhere in the system at step 805. If another tuner is available, then the system selects the available tuner for recording at step 806. The recording of the content begins at step 807.

If, however, the system 100 determines that an unused tuner is not available elsewhere in the system, the system then determines if the system component requesting the recording is in fact recording other content at step 808. If the system component is not recording other content, then the system 100 selects the system component's tuner for recording at step 809. The recording of the content then begins at step 810. If the system component is in fact recording other content, the system then determines that step 811 whether there is any tuner in the system that is not in fact recording content. If no other tuner is available, the system records an error at step 812, and the recording process 800 is aborted. If the system 100 determines that a tuner within the system is not recording, then the system selects that tuner for recording at step 813. From there, the process 800 for recording begins at 814.

FIG. 9 shows a flowchart representation of logic 900 used in determining which tuner should be used for content viewing. Beginning at step 901, the system receives a request from the user for program viewing. As step 902, the system 100 determines whether the system component requesting the viewing has its own tuner. If the system 100 determines that the system component does not have its own tuner, the system then determines, as step 903, whether there is an unused tuner available within the system. If the system 100 determines that there is an unused tuner available, then the system selects the unused tuner for program viewing at step 904, and the system begins using that tuner at step 905. If at step 903, the system determines that an unused tuner is not available, the system displays a message to the user telling the user that no tuner is available at step 906. The system 100 will then wait for the user to input the next command at 907, and the process 900 ends.

If at step 902 the system 100 determines that the requesting system component does have its own tuner, the system determines whether that specific tuner is currently recording content at 908. If the tuner is not recording content, the system 100 selects the requesting component's tuner for program viewing at step 909, and the system begins using the tuner at step 910. If, however, that requesting component's tuner is currently recording other content, then the system 100, at step 911, determines whether there is an available tuner elsewhere in the system. If there is not an available tuner within the system, the system 100 displays a message to the user telling the user that no tuner is available at step 912. The system will then wait for the user to input the next command at 913, and the process 900 ends. If, however, there is an available tuner within the system, the system 100 selects the available tuner for program viewing at step 914, and the system begins using the tuner at step 915. The process 900 then ends.

Figure 10A:
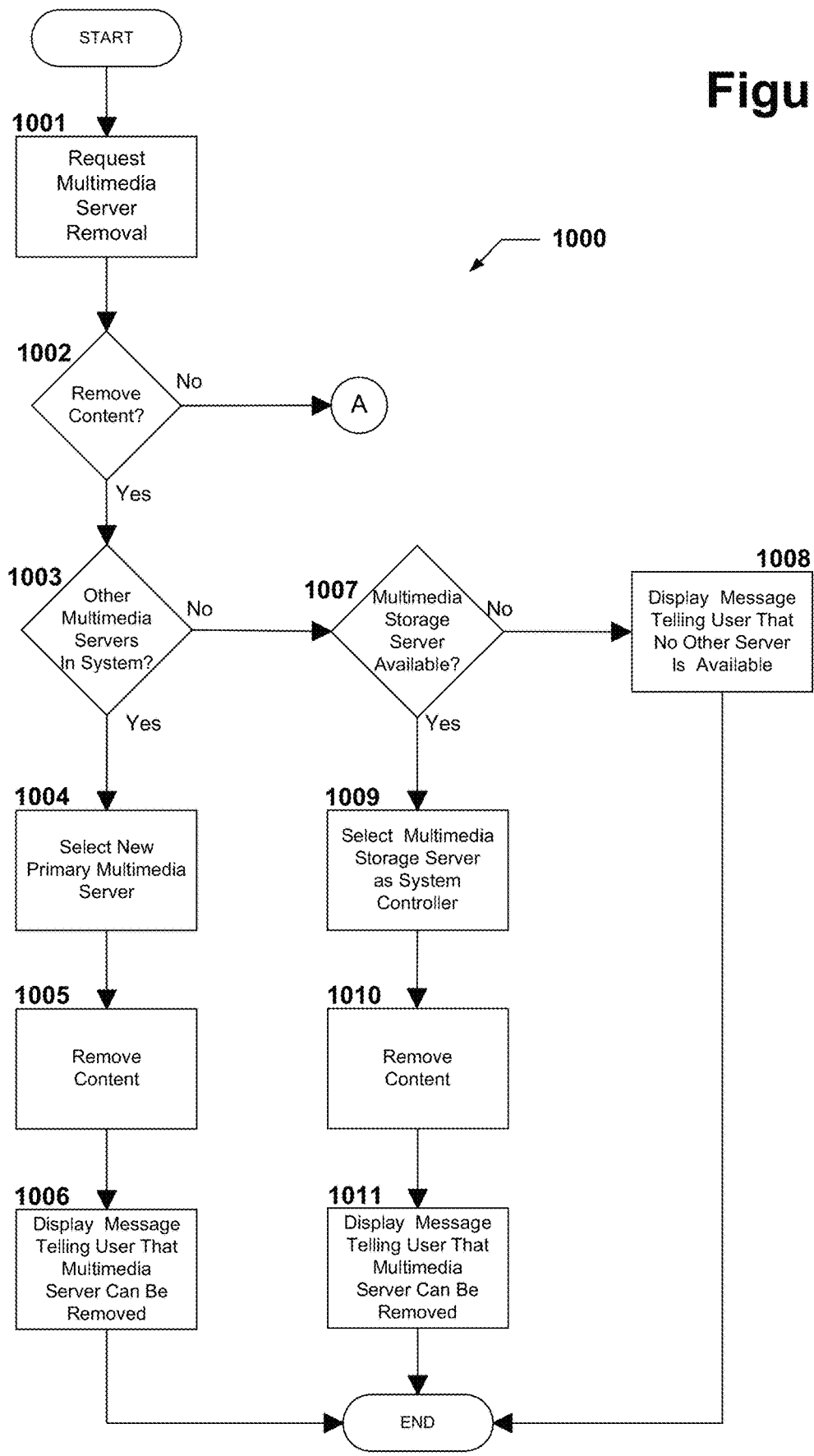
FIGS. 10A and 10B is a flow chart showing the process for a request for server removal in accordance with an exemplary embodiment of the present invention.
Figure 10B:
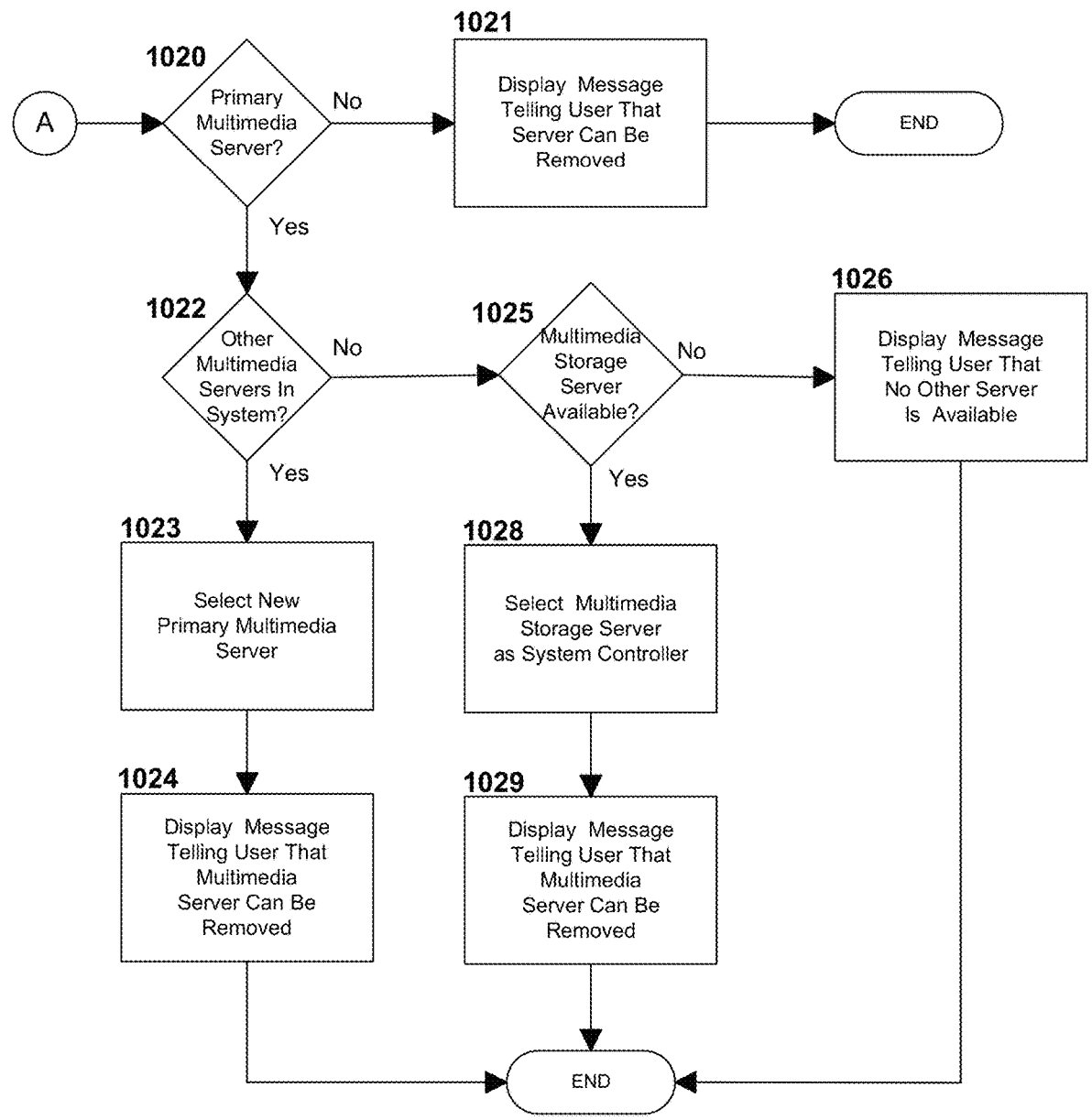

FIGS. 10A and 10B show a flowchart representation of logic 1000 used to request removal of a multimedia server 101 or 103. Beginning at step 1001, a request is received to remove a multimedia server (i.e., 101 or 103). At step 1002, the system 100 determines whether content will be removed from the server. If content is to be removed, the system at step 1003 determines whether there are other multimedia servers within the system. If another multimedia server is available, then the system 100, at step 1004, selects a new primary multimedia server from among the other multimedia servers within the system. The content on the original primary multimedia server is then moved (and/or copied) to the new primary multimedia server at step 1005. The system 100 then displays a message telling the user that the original multimedia server can be removed at step 1006. The logic 1000 then ends, and the user can physically remove the original multimedia server.

If, however, at step 1003 another multimedia server is not available, then the system determines whether a multimedia storage server is available at step 1007. If no multimedia storage server is available, the system displays a message telling the user that no other server is available at step 1008. The system will then wait for the user to input the next command, and the logic for requesting removal of the multimedia server ends.

If at step 1007, the system determines that a multimedia storage server is available, then the system 100, at step 1010, selects the multimedia storage server as the system controller. Then, the content located on the original primary multimedia server is copied and/or moved to the multimedia storage server at step 1011. The content can be moved or copied, as determined by the user. The system can also make a copy automatically if the original is being requested to the extent that it is causing degradation of the quality of content being delivered to the users. At step 1012, the system 100 displays a message to the user telling the user that the multimedia system can be removed. The logic 1000 for requesting removal of the multimedia server ends.

If, referring back to step 1002, the system determines that content is not to be removed from the multimedia server, then the system 100 proceeds to step 1020 (as depicted in FIG. 10B). At step 1020, the system determines whether the primary multimedia server is the server to be removed. If the system 100 determines that the server to be removed is not the primary multimedia server, then the system as step 1021 displays a message to the user telling the user that the server can be removed. The logic 1000 for removing a server then ends, and the user can then physically remove the server.

If, however, the system 100 determines the primary multimedia server is the server to be removed, then the system at step 1022 determines if there is another multimedia server within the system. If there is another multimedia server in the system, then the system 100 selects a new primary multimedia server from among the other multimedia servers in the system at step 1023. Then, the system 100 displays a message to the user telling the user that the multimedia server can now be removed at step 1024. The logic 1000 for removing the server then ends, and the user can physically remove the server.

If, on the other hand, another multimedia server is not within the system, then the system determines at step 1025 whether a multimedia storage server is available. If no multimedia storage server is available, then the system displays a message to the user telling the user that no other server is available at step 1026. The system will then wait for the next command, and the logic 1000 for removing the server ends. If the system determines a multimedia storage server is available, the system selects the multimedia storage server as the system controller at step 1028. Next, the system 100 displays a message to the user telling the user that the multimedia server can now be removed. Then, the logic 1000 for removing a server then ends, and the user can physically remove the server.

Figure 11:
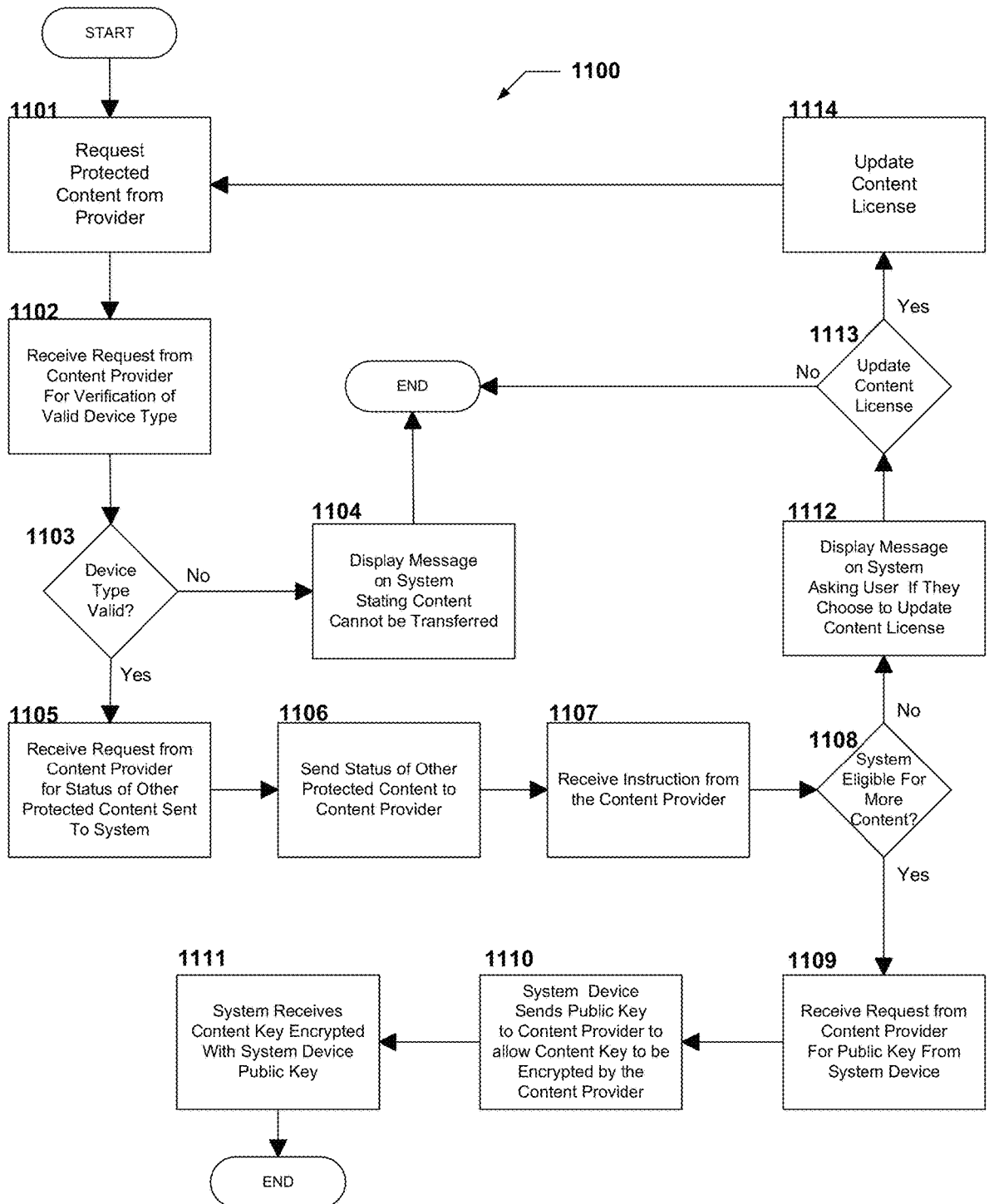
FIG. 11 is a flow chart showing the process for a request for transfer of protected content from a provider.

FIG. 11 shows a flowchart representation of a process 1100 of requesting protected content from the external content provider 203. Beginning at step 1101 the system 100 requests protected content from the external content provider. Next, the system 100 receives a request from the content provider for verification of a valid device type at step 1102. The system 100, at step 1103 determines whether the device type is valid. If the device type is not valid, then the system 100, at step 1104, displays a message on the system to the user stating that the content cannot be transferred. Thus, the content is not transferred, and the process 1100 ends.

If, however, the system determines that the device type is valid, then the system receives a request from the external content provider for the status of other protected content sent to the system at step 1105. The system 100 then sends status information to the content provider at step 1106. At step 1107, the system 100 receives instruction from the content provider. Based on the instruction received from the content provider, the system determines if it is eligible to receive additional content at step 1107. If the system 100 is eligible to receive additional content, then the system receives a request from the content provider for the public key from the system device at step 1109. Next at step 1110, the system device sends its public key to the content provider so that the content key sent from the content provider can be encrypted with the system device's public key. At step 1111, the system 100 receives the content key that is encrypted with the system device's public key and the content, which is encrypted using the content key. The process 1100 of requesting protected content from the content provider ends.

If, however, at step 1108 the system determines it is not eligible to receive additional content, then the system displays a message asking the user if he or she chooses to update the content license at step 1112. The system then determines at step 1113 whether it has received an input to update the content license. If the system does receive an input to update the content license, the content license is updated at step 1114, and the process 1100 can loop back to step 1101, where the system, now with the updated content license, requests protected content from the content provider. If no input is received or if an input is received not to update the content license, then the process 1100 of requesting protected content from the content provider ends.

With this capability, the user and the content provider have an interactive relationship that allows considerable flexibility and ease of use for the user. An example of this process can occur when a user chooses to download a new movie to the system. The content provider can check the total quantity of movies that the user has in use by mail order rental, in-store rental, and downloaded rental. Thus, this embodiment is an improvement upon the prior art because it allows the content provider the capability to check the total quantity of movies, music, video games or other content which the user has in use by mail order rental, in-store rental, or downloaded rental as compared to just the status of the mail order items. This allows instant return of items by the system user which then allows checkout of additional content.

It is important to note here that the content key, referred to throughout this document is the key used to encrypt the protected content and is then used to decrypt the content for usage. Two additional files are also used by the system for storing relevant information for future use by the system or content provider. One such file is the content license status file, which includes various types of information relating to how the content may be used such as name of content provider, content description, license information, time restraints on usage, number of allowed usages, quantity of copies allowed, and the network where content stored. Another such file is the content usage history file, which contains data related to content usage history.

Figure 12:
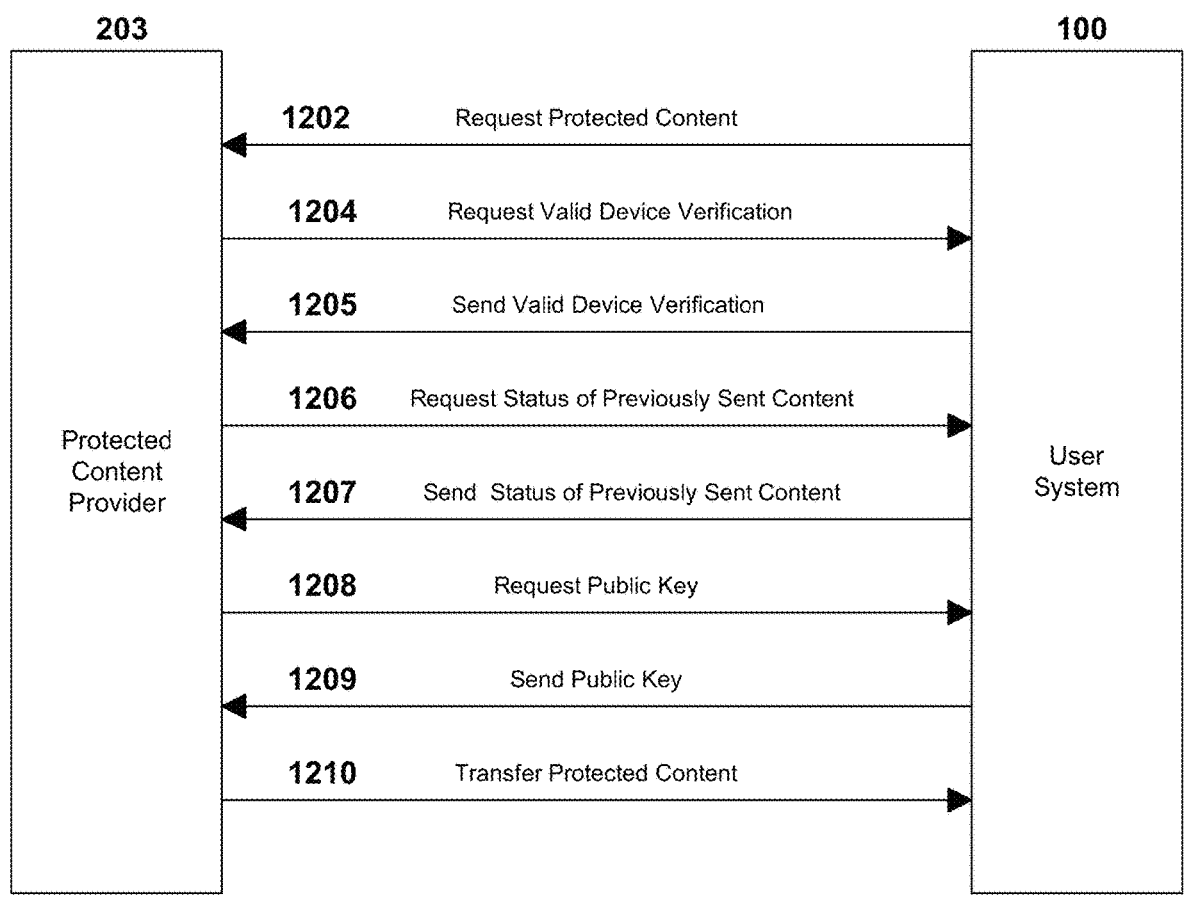
FIG. 12 is a block diagram showing a request for transfer of protected content from a content provider in accordance with an exemplary embodiment of the present invention.

FIG. 12 depicts a block diagram representation of the relationship between the system 100 and the external content provider 203 when the system requests protected content from the content provider. The system 100 requests protected content from the content provider 203 at step 1202. Once the content provider 203 receives this request, the content provider requests verification of a valid device type from the system 100 at step 1204. Upon receiving this information, the system 100 sends verification of a valid device type to the content provider 203 at step 1205. Once the content provider 203 verifies a valid device type, the content provider requests the status of previously sent content from the system 100 at step 1206. Then at step 1207, the system 100 sends the status of previously sent content to the content provider 203. If the content provider 203 determines that the status information is acceptable, the content provider then requests the public key from the system 100 at step 1208. Then the system 100 sends the public key to the content provider 203 at step 1209. Once the public key is received, the content provider encrypts the content key and transfers the content key and content encrypted using the content key to the system 100 at step 1210.

Figure 13:
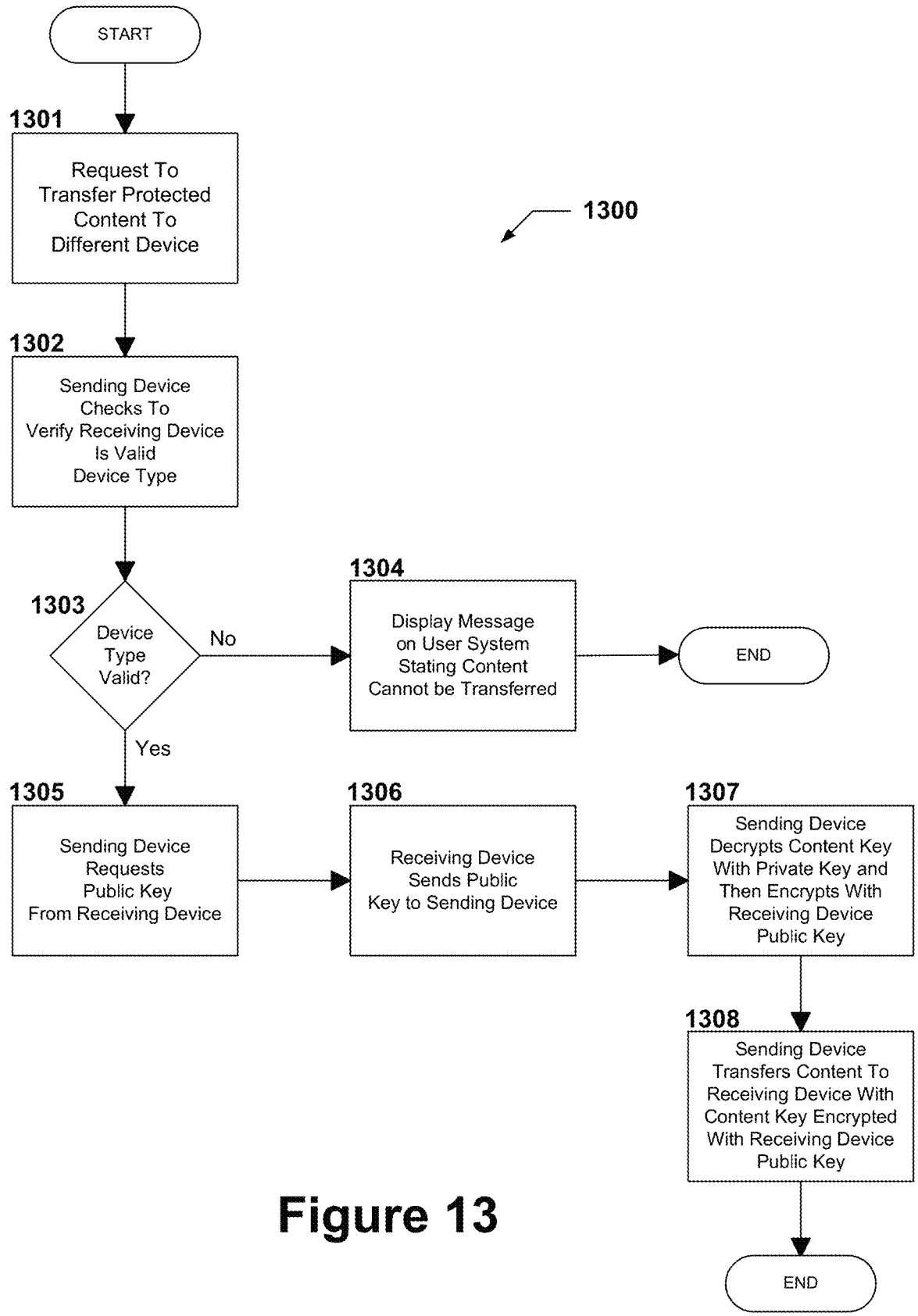
FIG. 13 is a flow chart showing the process of a transfer of protected content between system devices.

FIG. 13 depicts a flowchart representation of a process 1300 for moving content between two system devices. Beginning at step 1301, the system 100 receives a request to transfer protected content from one system device to another system device. It should be noted that the request for transfer can be initiated by the sending device, receiving device, or by a third system device not currently involved in the transfer. For example, the user can network to the system, via the internet using a valid system device, and can instruct the system to move protected content from a multimedia server to a remote multimedia server, so that the remote multimedia server can later be detached from the system and used to view the protected content while traveling. Another example can occur when a user accessing a local multimedia client instructs the system to move protected content from a multimedia server in the home to a multimedia server in an automobile, which is located in the garage of the home, via a wireless connection, so the user can view the protected content in the automobile.

As step 1302, the sending device verifies that the receiving device is a valid device type. For purposes of this discussion, the sending device is the device containing the content to the transferred, and the receiving device is the device that is to receive the content from the sending device. If the system 100 determines as step 1303 that the device type is not a valid device type, then at the step 1304 the system displays a message stating that the content cannot be transferred to the receiving device. Thus, the process 1300 ends.

If, however, the system 100 determines that the device type is valid, then the sending device requests the public key from the receiving device at step 1305. At step 1306, the receiving device sends its public key to the sending device. Upon receiving the public key, the sending device, at step 1307, decrypts the content key with the private key and then encrypts the content key with the receiving device's public key. At 1308, the sending device transfers the content to the receiving device with the content key encrypted with the receiving device's public key. At this point, the process 1300 ends. It should be noted that the protected content can be streamed from the sending device to the receiving device, in an encrypted format, where it is decrypted by the receiving device, using the private key, and accessed for use.

Figure 14:
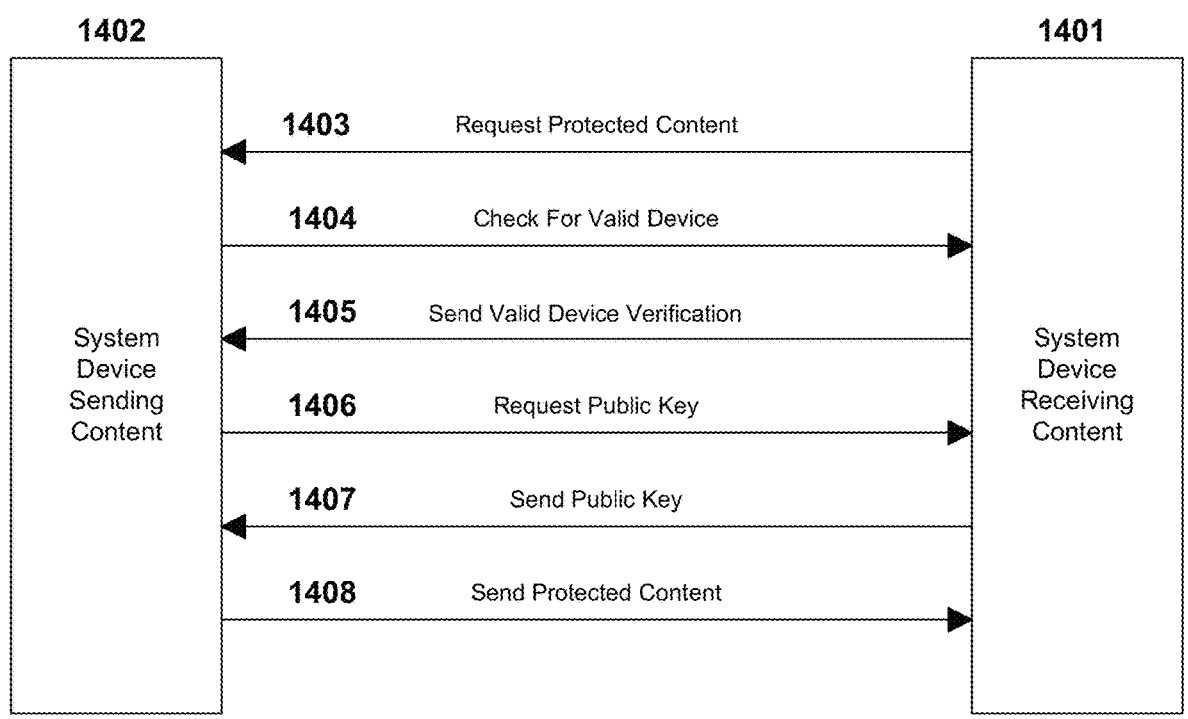
FIG. 14 is a block diagram showing a transfer of protected content between system devices in accordance with an exemplary embodiment of the present invention.

FIG. 14 depicts a block diagram representation of the relationship between the sending device and the receiving device when the receiving device requests protected content from the sending device. The receiving device 1401 requests protected content from the sending device 1402 at step 1403. Upon receipt of the request, the sending device 1402 requests verification of a valid device type from the receiving device 1401 at step 1404. Then at step 1405, the receiving device 1401 sends verification of a valid device type to the sending device 1402. The sending device 1402, in turn, requests the public key from receiving device 1401 at step 1406. Upon receiving the request for its public key, the receiving device 1401 sends the public key to the sending device 1402 at step 1407. Then, the sending device 1402 transfers the encrypted content to the receiving device 1401 at step 1408.

Figure 15:
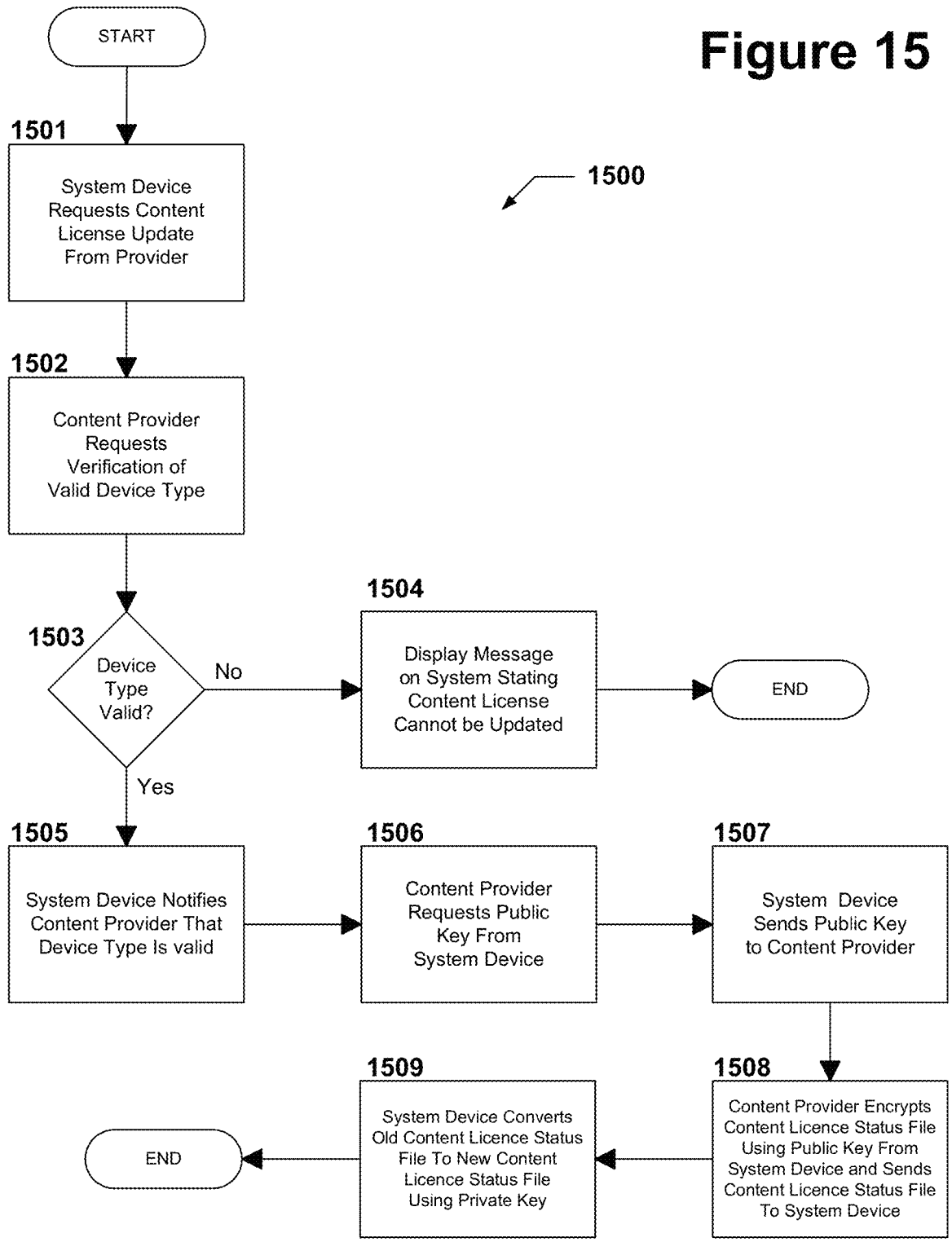
FIG. 15 is a flow chart showing the process for a request for a content license update from a provider in accordance with an exemplary embodiment of the present invention.

FIG. 15 depicts a flowchart representation of a process 1500 a system device undergoes when requesting a license update for protected content from an external content provider. Beginning at step 1501, the system device requests a content license update from the external content provider 203. At step 1502, the system 100 receives a request from the content provider 203 for verification of a valid device type. The system 100, at step 1503, determines if the device type is valid. If the device type is not valid, then the system 100 displays a message to the user stating that the content license cannot be updated at step 1504. The process 1500 for requesting a license update for protected content ends.

If, however, the system determines that the device type is valid, then the system notifies the content provider of the same at step 1505. At step 1506, the system 100 receives a request from the content provider 203 for the public key from the system device. Next, the system device sends its public key to the content provider at step 1507. Upon receiving the system device's public key, the content provider encrypts the updated content license status file with a system device public key and then transfers the updated content license status file that is encrypted with the system device public key at step 1508. Next, the system device converts the old content license status file to the new content license status file by using its private key. At this point, the process 1500 ends.

This ability to check the status of content on the system 100 and update the content license instantly allows a considerable flexibility and ease of use for the user and a real-time inventory status update for the content provider. An example where this could be very advantageous for both would be when a user chooses to download a new movie to the user system. The content provider can check the total quantity of movies which the user has in use by mail order rental, in-store rental, and downloaded rental. If the content provider determines that the user has the maximum number of movies rented by mail order rental, in-store rental, and downloaded rental, then the content provider can allow the user can choose to instantly 'return' an online movie, by license revocation, and then download a new movie for rental while staying within the requirements specified by the content provider.

Figure 16:
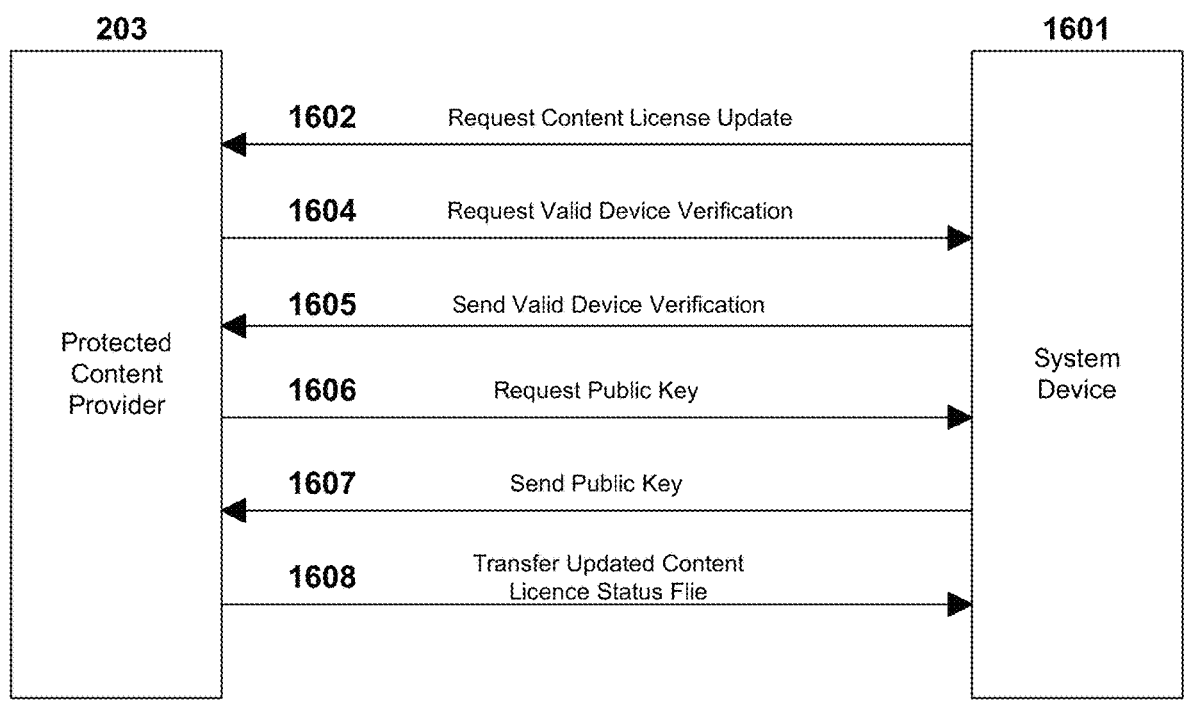
FIG. 16 is a block diagram showing a request for a content license update from a provider in accordance with an exemplary embodiment of the present invention.

FIG. 16 depicts a block diagram representation of the relationship between the system device 1601 and the external content provider 203 when the system device 1601 requests a license update for protected content from the external content provider 203. The system device 1601 requests a content license update from the content provider 203 at step 1602. At step 1604, the content provider 203 requests verification of a valid device type from the system device 1601. The system device 1601, in turn at step 1605, sends verification of a valid device type to the content provider 203. Upon receiving verification of a valid system device, the content provider 203, at step 1606, requests the public key from system device 1601. The system device 1601 then sends its public key to content provider 203 at step 1607. Upon receiving the system device's public key, the content provider 203 encrypts the content license status file and transfers the updated content license status file to system device 1601 at step 1608.

Figure 17A:
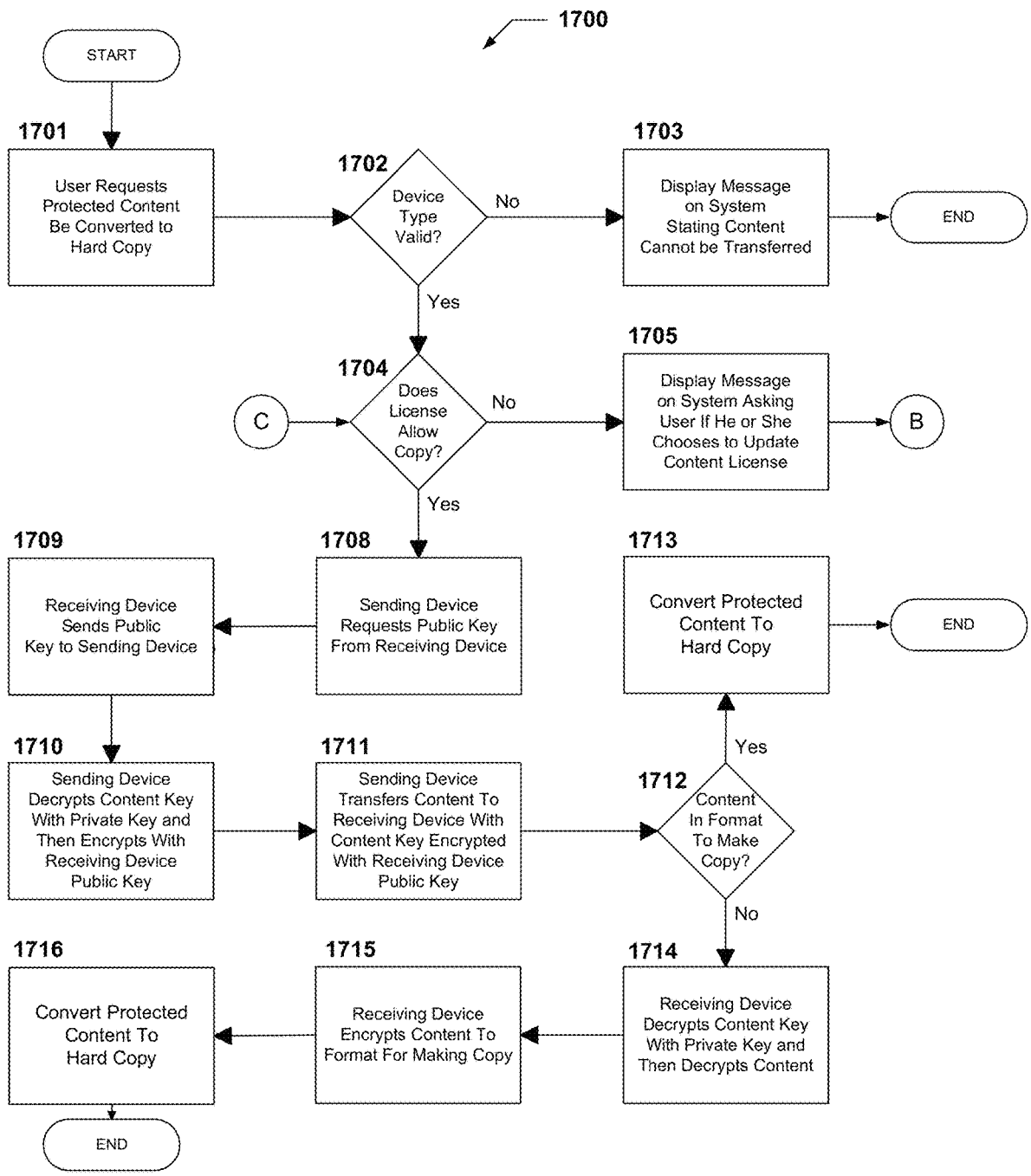
FIGS. 17A and 17B are a flow chart showing the process for a request to create a hard copy of protected content in accordance with an exemplary embodiment of the present invention.
Figure 17B:
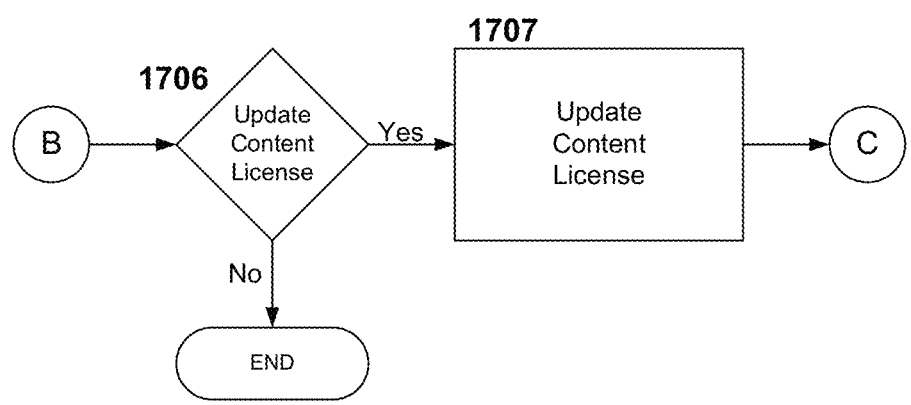

FIGS. 17 and 17B depict a flow representation of a process 1700 of converting protected content to a hard copy. For this description, the sending device is the device sending the content and the receiving device is the device receiving and creating a copy of the content. Beginning at step 1701, the user requests protected content be converted to a hard copy. At step 1702, the system 100 determines whether the device type is valid. If the device type is not valid, the system 100, at step 1703, displays a message to the user stating that the content cannot be transferred. Then, the process 1700 ends. If, however, the device type is valid, then the system 100, at step 1704, determines whether the license allows a copy to be made. If the license does not allow a copy to be made, the system 100 displays a message to the user asking the user if he or she chooses to update the content license. The user can then choose to update the license or not at step 1706. If the user does not update the license, the process 1700 ends. If the user does choose to update the content license, the content license is then updated at step 1707, and the process 1700 can loop back to the determination box 1704.

If the system 100 determines that the license allows a copy to be made at step 1704, then the sending device requests the public key from the receiving device at step 1708. The receiving device then sends its public key to the sending device at step 1709. At the step 1710, the sending device decrypts the content key with its private key and then encrypts the content key with the receiving device's public key. At step 1711, the sending device transfers the content to the receiving device with the content key encrypted with the receiving device's public key. Next, the system 100 determines whether the content is in a format to make copy at step 1712. If the content is in a proper format, the content is converted to a hardcopy at step 1713. At this point, the process 1700 then ends. If, however, the content is not in a format to make a copy, then the receiving device decrypts the content key with its private key and then decrypts a content and step 1714. Then at step 1715, the receiving device encrypts the content and formats the content such that a copy can be made. The content is then converted to a hardcopy at step the 1716, and the process 1700 then ends.

It should be noted that in some cases the content may be download from the content provider in a format which can be converted directly to a hard copy. In this case, the content can still be moved to a valid system device such that the valid system device limits other uses of the content.

While the invention has been shown and described in preferred forms, it will be apparent to those skilled in the art that many modifications, additions, and deletions can be made therein. These and other changes can be made without departing from the spirit and scope of the invention as set forth in the following claims.

What is claimed is:

1. A multimedia system comprising:
a multimedia server and a multimedia client, each further comprising at least one or more hardware processors;
the multimedia server configured to:
receive an uncompressed signal from an audio/video source device;
encode a media stream from the uncompressed signal using an encoder;
transmit the media stream over a network; and
reduce contention of the network and improve both data exchange and data usage of the network by varying the data flow rate between the multimedia server and the multimedia client based on a data flow rate specified by the multimedia client;
the multimedia client configured to:
communicate with the multimedia server over the network;
specify the data flow rate between the multimedia server and the multimedia client;
receive the media stream; and
play the media stream for a user.

2. The multimedia system of claim 1, wherein the multimedia server includes an interface to receive the uncompressed signal from a plurality of audio/video source devices.

3. The multimedia system of claim 1, wherein the network comprises the Internet.

4. The multimedia system of claim 1, wherein the multimedia server is further configured to encode the media stream by digitizing and compressing the uncompressed signal received from the audio/visual source device.

5. The multimedia system of claim 1, wherein the uncompressed signal is a live stream from the audio/visual source device.

6. The multimedia system of claim 1, wherein the multimedia client employs a graphical user interface (GUI).

7. The multimedia system of claim 1, wherein the multimedia client communicates with the multimedia server through a Web server.

8. The multimedia system of claim 1, wherein the multimedia client is a remote multimedia client.

9. The multimedia system of claim 8, wherein the remote multimedia client is a portable device.

10. The multimedia system of claim 8, wherein the remote multimedia client has multiple tuners.

11. The multimedia system of claim 8, wherein the remote multimedia client is configured to allow unlimited use of unprotected content.

12. The multimedia system of claim 11, wherein the remote multimedia client is configured to allow limited use of protected content according to guidelines specified by a provider of the protected content.

13. The multimedia system of claim 8, wherein the remote multimedia client is configured to detach from communication with the multimedia server and allow use of content stored on the remote multimedia client.

* * * * *